(12) United States Patent
Chihara et al.

(10) Patent No.: US 9,277,213 B2
(45) Date of Patent: Mar. 1, 2016

(54) VIDEO ENCODING DEVICE

(75) Inventors: Nobuhiro Chihara, Tokyo (JP);
Masashi Takahashi, Tokyo (JP);
Muneaki Yamaguchi, Tokyo (JP)

(73) Assignee: Hitachi Kokusai Electric Inc. (JP)

( * ) Notice: Subject to any disclaimer, the term of this patent is extended or adjusted under 35 U.S.C. 154(b) by 255 days.

(21) Appl. No.: 14/123,282

(22) PCT Filed: May 29, 2012

(86) PCT No.: PCT/JP2012/063761
§ 371 (c)(1),
(2), (4) Date: Dec. 2, 2013

(87) PCT Pub. No.: WO2012/165428
PCT Pub. Date: Dec. 6, 2012

(65) Prior Publication Data
US 2014/0119431 A1 May 1, 2014

(30) Foreign Application Priority Data

Jun. 1, 2011 (JP) .................................. 2011-123083

(51) Int. Cl.
*H04N 11/02* (2006.01)
*H04N 19/103* (2014.01)
*H04N 19/56* (2014.01)
(Continued)

(52) U.S. Cl.
CPC ....... *H04N 19/00018* (2013.01); *H04N 19/112* (2014.11); *H04N 19/139* (2014.11); *H04N 19/14* (2014.11); *H04N 19/172* (2014.11); *H04N 19/56* (2014.11)

(58) Field of Classification Search
CPC .................. H04N 19/00018; H04N 19/00684; H04N 19/56; H04N 19/14
USPC ...................................................... 375/240.02
See application file for complete search history.

(56) References Cited

U.S. PATENT DOCUMENTS 5,347,308 A 9/1994 Wai
5,784,107 A 7/1998 Takahashi
(Continued)

FOREIGN PATENT DOCUMENTS

JP H5-103312 A 4/1993
JP H6-165146 A 6/1994
(Continued)

OTHER PUBLICATIONS

International Search Report.
(Continued)

*Primary Examiner* — Hee-Yong Kim
(74) *Attorney, Agent, or Firm* — Bacon & Thomas, PLLC

(57) ABSTRACT

Provided is a video encoding device having an AFF-mode-determining unit (140) for determining the AFF mode when an input image is an interlaced image, and a video encoding unit (110) for encoding the input image depending on a result of the mode determination obtained from the AFF-mode-determining unit (140). The AFF-mode-determining unit (140) makes a determination combining: a mode determination result based on each of a texture value when an image is treated as a field and a frame, or based on an equivalent object; and a mode determination result based on the ease of predicting a motion vector in both encodings estimated with reference to a previously obtained movement vector, or based on the cost.

6 Claims, 26 Drawing Sheets

(51) Int. Cl.
*H04N 19/139* (2014.01)
*H04N 19/172* (2014.01)
*H04N 19/112* (2014.01)
*H04N 19/14* (2014.01)
*H04N 19/51* (2014.01)

(56) References Cited

U.S. PATENT DOCUMENTS

2008/0260022 A1* 10/2008 Huang ............... H04N 19/176 375/240.02
2011/0176740 A1 7/2011 Teo et al.

FOREIGN PATENT DOCUMENTS

JP 2008-283595 A 11/2008
JP 2009-55143 A 3/2009
WO 2011/013304 A 2/2011

OTHER PUBLICATIONS

Yanmei Qu et al., A fast MBAFF mode prediction strategy for H.264/AVC, Proceedings of International Conference on Signal Proceeding (ICSP '04), 2004.08, vol. 2, pp. 1195-1198.

Lejun Yu et al., Fast Picture and Macroblock Level Adaptive Frame/Field Coding for H.264, IEEE Asia Pacific Conference on Circuits and Systems (APCCAS 2006), 2006.12, pp. 768-771.

* cited by examiner

INTERLACE

PROGRESSIVE

VIDEO ENCODING DEVICE

FIELD OF THE INVENTION

The present invention relates to a video encoding device for encoding a moving picture, and more particularly to a video encoding device for adaptive field/frame coding.

BACKGROUND OF THE INVENTION

In recent years, video encoding technology has become essential technology due to an increase in video streaming content with the development of broadband networks, the use of large-screen video display equipment and high-capacity storage media such as a DVD, or the like. Further, along with a high resolution image pickup device or a high resolution display device, a technique for encoding at high resolution in the moving picture encoding technology has become essential.

An encoding process is a process of converting an original image that is inputted to a video encoding device into a stream with less amount of data. However, as one of video encoding techniques capable of achieving encoding with high image quality and high resolution, there is H.264/AVC (Advanced Video Coding) that is an international standard. In the H.264/AVC encoding scheme, encoding is performed using prediction techniques such as intra-frame prediction and inter-frame prediction. Further, in the H.264/AVC encoding process, generally, processing is performed on the basis of a macroblock (hereinafter, appropriately referred to as "MB") consisting of 16×16 pixels for the original image.

As a prediction scheme used in H.264/AVC encoding, mainly, there are two prediction schemes of intra-frame prediction and inter-frame prediction. In the intra-frame prediction, there are provided a plurality of prediction schemes in accordance with the size of a block serving as a unit of prediction or to a combination of prediction directions. Also in the inter-frame prediction, there are provided a plurality of prediction schemes in accordance with the size of a block serving as a unit of prediction. In H.264/AVC, the prediction scheme is selected dynamically in accordance with the code amount or target image quality, thereby realizing an encoding scheme with high image quality and high compression.

Hereinafter, an outline of H.264/AVC encoding will be described with reference to FIG. 18. FIG. 18 is a diagram showing a configuration of a conventional video encoding device for performing a H.264/AVC encoding process.

In an encoding process using intra-frame prediction, a mode selection unit 930 selects an intra-frame prediction unit 910. Then, a stream 91 is obtained from an original image 90 through the intra-frame prediction unit 910, an orthogonal transformation unit 940, a quantization unit 950 and a variable length encoding unit 980. Further, in an encoding process using inter-frame prediction, the mode selection unit 930 selects an inter-frame prediction unit 920. Then, the stream 91 is obtained from the original image 90 through the inter-frame prediction unit 920, the orthogonal transformation unit 940, the quantization unit 950 and the variable length encoding unit 980.

The original image 90 and a reconstructed image 92 are inputted to the intra-frame prediction unit 910. The reconstructed image 92 is an image configured by combining a restored difference image 97 outputted from an inverse orthogonal transformation unit 970 and a prediction image 95 outputted from the mode selection unit 930.

Further, an appropriate intra-frame prediction mode is selected from the original image 90 and the reconstructed image 92 by an intra-frame prediction process to generate intra-frame prediction information D81 representing mode information of the intra-frame prediction mode, an intra-frame prediction image 93 that is a prediction result, and an intra-frame prediction error D82 representing a difference between the original image 90 and the intra-frame prediction image 93. Further, the intra-frame prediction information D81 includes intra-frame prediction mode information representing the direction of the intra-frame prediction, and an intra-frame prediction block type representing the block size when the intra-frame prediction is performed.

The inter-frame prediction unit 920 receives the original image 90 and the reconstructed image 92 generated from an original image before or after the original image 90 (in the past or future), and generates inter-frame prediction information D83, an inter-frame prediction image 94, and an inter-frame prediction error D84 representing a difference between the original image 90 and the inter-frame prediction image 94. The inter-frame prediction information D83 includes motion vector information as a result of performing motion compensation, and an inter-frame prediction block type representing the block size when the inter-frame prediction is performed.

An encoding controller 990 determines an encoding mode of one of intra-frame prediction and inter-frame prediction in accordance with an encoding mode selection algorithm based on the intra-frame prediction error D82 inputted from the intra-frame prediction unit 910, the inter-frame prediction error D84 inputted from the inter-frame prediction unit 920, and code amount information D86 (which will be described later) inputted from the variable length encoding unit 980. Then, the encoding controller 990 outputs, to the mode selection unit 930, encoding mode selection information D87 indicating the determined encoding mode. Also the encoding controller 990 determines a quantization coefficient D88 in accordance with a rate control algorithm, and outputs the quantization coefficient D88 to the quantization unit 950.

Since the encoding mode selection algorithm and the rate control algorithm have a great influence on the code amount of the stream 91 and image quality, there are various ways depending on the content of the original image 90 to be encoded or the application of video coding.

In accordance with the encoding mode selection information D87 inputted from the encoding controller 990, the mode selection unit 930 outputs the intra-frame prediction image 93 as a prediction image 95 if the intra-frame prediction unit 910 has been selected, and outputs the inter-frame prediction image 94 as the prediction image 95 if the inter-frame prediction unit 920 has been selected.

The orthogonal transformation unit 940 generates frequency components D89 from a difference image 96 corresponding to a difference between the original image 90 and the prediction image 95 by using an orthogonal transform process.

The quantization unit 950 performs a quantization process on the frequency components D89 inputted from the orthogonal transformation unit 940 based on the quantization coefficient D88 inputted from the encoding controller 990, and outputs quantization values D90 with a reduced amount of information.

An inverse quantization unit 960 performs an inverse quantization process on the quantization values D90 to generate restored frequency components D91.

The inverse orthogonal transformation unit 970 performs an inverse orthogonal transform process on the restored frequency components D91 to generate the restored difference image 97. Then, the generated restored difference image 97 and the prediction image 95 outputted from the mode selection unit 930 may be combined and stored as the reconstructed image 92.

The variable length encoding unit 980 encodes the quantization values D90 and the intra-frame prediction information D81 or inter-frame prediction information D83 into a data string having a smaller amount of data, and outputs the data string as a stream 91. Also, the variable length encoding unit 980 outputs the code amount information D86 to the encoding controller 990. The code amount information D86 indicates the code amount of the stream 11 after variable length encoding.

In the conventional video encoding device shown in FIG. 18, as the original image 90 to be inputted, there are two types, i.e., an interlaced image and a progressive image. FIGS. 19A and 19B are diagrams illustrating an interlaced image and a progressive image.

As shown in FIG. 19A, the interlaced image is configured by extracting ½ of the progressive image in a vertical direction, and the whole image is obtained by alternately arranging a top field obtained by extracting only odd-numbered lines and a bottom field obtained by extracting only even-numbered lines from the top of the screen.

On the other hand, as shown in FIG. 19B, the progressive image is a full-size image that is not subjected to an extraction process.

However, in H.264/AVC, when the original image 90 is the interlaced image, there is provided an encoding tool called adaptive field/frame coding (hereinafter, referred to as "AFF") which is capable of improving the encoding efficiency (see, e.g., Patent Document 1).

FIG. 20 is a diagram illustrating adaptive field/frame coding (AFF) of conventional H.264/AVC. In the case where the input image is the interlaced image, the AFF is an encoding process method in which encoding is performed while switching, on a frame-by-frame basis, between frame coding for encoding the top field and bottom field as one frame as shown in (a) of FIG. 20, and field coding for encoding the top field and bottom field as separate pictures as shown in (b) of FIG. 20.

For example, if there is no change in the brightness or if the motion of the image is small, i.e., if the difference is small between the top field and the bottom field, the pixel density in the vertical direction in frame coding becomes two times as large as that in field coding, and thus pixel correlation in the image increases in frame coding. Accordingly, it can be expected that the accuracy of the intra-frame prediction is improved, and the encoding efficiency is improved. Also in the inter-frame prediction, in frame coding compared to field coding, prediction efficiency in a pixel block is improved due to an increase in the pixel density. Accordingly, a larger prediction block can be easily selected, and thus the encoding efficiency may be improved.

On the other hand, if a change in brightness or motion in the image is large, and a change occurs between images of the top field and bottom field, pixel correlation in the image decreases in frame coding. Thus, in both of the intra-frame prediction and the inter-frame prediction, the encoding efficiency is lowered when performing frame coding than performing field coding.

Therefore, in the case of using the AFF of H.264/AVC, in order to improve the encoding efficiency, it is important to appropriately perform switching between field coding and frame coding depending on the status of the image.

Further, FIG. 21 is a diagram showing an outline of an encoding mode determination method of the conventional AFF. In reference software JM in conventional H.264/AVC, a multi-pass technique has been used to determine the encoding mode of the AFF.

Specifically, the original image 90 is encoded by both a video encoding unit 810 for frame coding and a video encoding unit 820 for field coding. Then, an output stream of either one is selected by an AFF mode selection unit 830, and it is outputted finally as the stream 91.

Further, in the AFF, there are a method of performing switching between field coding and frame coding for each picture, and a method of performing switching between field coding and frame coding for each macroblock. The former is called picture adaptive field/frame coding (PAFF), and the latter is called macroblock adaptive field/frame coding (MBAFF).

FIG. 22 is a diagram showing an outline of an encoding mode determination method in conventional PAFF and MBAFF. In the H.264/AVC standard, the PAFF and MBAFF may be nested in each other, and the MBAFF can be used only when frame coding is selected in the PAFF. In the case of using the PAFF, two units, i.e., a video encoding unit 860 and a video encoding unit 870 are used for frames so that frame coding is performed by the video encoding unit 860 and field coding is performed by the video encoding unit 870. Then, a PAFF mode selection unit 880 determines which one of AFF modes is advantageous in encoding efficiency based on the encoding results for each frame, and selects the encoding result with higher efficiency.

If frame coding is selected in the PAFF, the MBAFF can be also used. Similarly, in the case of using the MBAFF, two units, i.e., video encoding units 861 and 862 are used so that frame coding is performed by one video encoding unit 861 and field coding is performed by the other video encoding unit 862. Then, a MBAFF mode selection unit 863 determines which one of AFF modes is advantageous in encoding efficiency from the encoding results for each super MB of 16×32 pixels (the number of horizontal pixels×the number of vertical pixels, the same applies to the following), and selects the encoding result with higher efficiency.

Then, each of the MBAFF mode selection unit 863 and the PAFF mode selection unit 880 selects an output stream of one of modes in each frame for each super MB of 16×32 pixels, and finally outputs the selected output stream as the stream 91.

[Patent Document 1] Japanese Patent Application Publication No. 2008-283595

However, in the conventional encoding method, it is necessary to perform different types of encoding processes, i.e., frame coding and field coding, multiple times on a frame basis or on a pixel block basis of 16×32 pixels for one input image. Accordingly, in the case of using the AFF, the processing amount may increase two or more times as compared to when the AFF is not used.

SUMMARY OF THE INVENTION

In view of the above, the present invention provides a video encoding device for performing adaptive field/frame coding (AFF) and capable of reducing the processing amount of an encoding process in the case of using the AFF.

In accordance with an aspect of the present invention, there is provided a video encoding device including an AFF mode determining unit configured to perform mode determination of adaptive field/frame coding when an input image is an interlaced image, and a video encoding unit configured to encode the input image in accordance with a determination result of the mode determination by the AFF mode determining unit.

In accordance with another aspect of the present invention, the AFF mode determining unit performs the mode determination by comparing pixel differences in the field coding and the frame coding of the input image.

In accordance with still another aspect of the present invention, the AFF mode determining unit performs the mode determination by using motion vector information that is a result of inter-frame prediction of a picture that has been subjected to an encoding process in the video encoding unit.

In accordance with still another aspect of the present invention, the AFF mode determining unit includes a vertical pixel difference (VPD) determination unit configured to perform mode determination of the adaptive field/frame coding by estimating a texture value in field coding of the input image based on an absolute difference of pixel values between a top field and a bottom field constituting a pair, estimating a texture value in the frame coding based on an absolute difference of pixel values between adjacent lines in the top field or the bottom field, and selecting the coding that gives a smaller texture value, a motion vector (MV) determination unit configured to perform mode determination of the adaptive field/frame coding by receiving motion vector information that is a result of inter-frame prediction of a picture that has been subjected to an encoding process in the video encoding unit, estimating a motion vector cost while assigning different weights to x and y components of the vector information, and calculating the number of times at which the estimated cost exceeds a critical value, and an integration determination unit configured to perform the mode determination based on a mode determination result in the VPD determination unit and a mode determination result in the MV determination unit.

In accordance with the present invention, it is possible to reduce the processing amount of an encoding process while maintaining encoding efficiency.

DETAILED DESCRIPTION OF THE EMBODIMENTS

Figure 1:
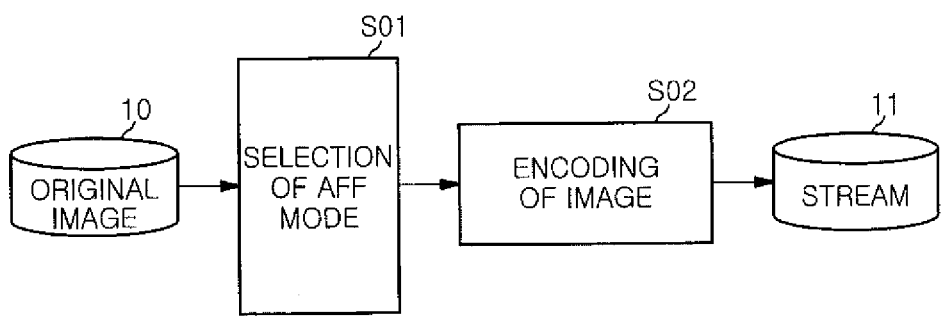
FIG. 1 is a diagram illustrating the concept of an encoding method in a video encoding device in accordance with an embodiment of the present invention.

Hereinafter, embodiments of the present invention will be described with reference to the drawings. In each of the drawings referred to in the following description, the same components as those of the other drawings are denoted by the same reference numerals.

(Concept of Encoding Method)

FIG. 1 is a diagram illustrating the concept of an encoding method in a video encoding device in accordance with the present embodiment.

In the encoding method in accordance with the present embodiment, AFF mode determination is performed to determine which one of frame coding and field coding is advantageous in encoding efficiency (S01) before encoding of an original image 10 inputted to the video encoding device is performed (S02). Then, in accordance with the result of the AFF mode determination, either the frame coding or field coding is performed.

Thus, it is possible to reduce a processing amount of encoding process almost without lowering encoding efficiency, compared to a conventional encoding method.

(Configuration of Video Encoding Device)

Figure 2:
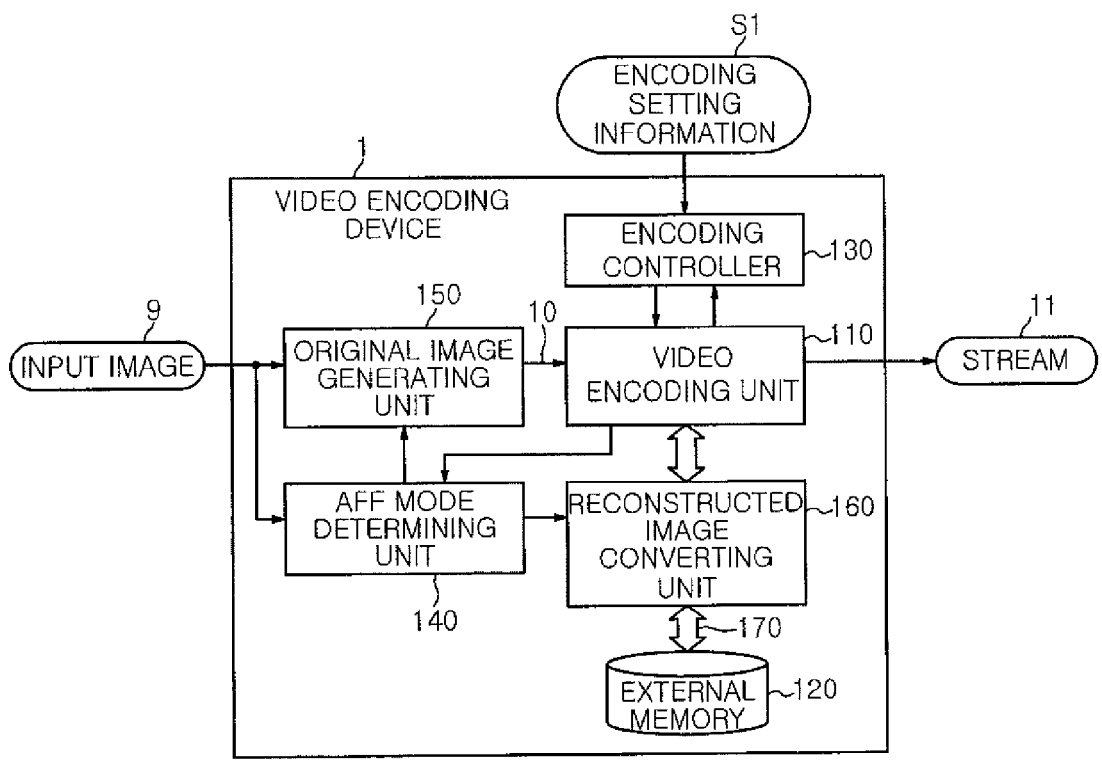
FIG. 2 is a diagram showing an example of the configuration of the video encoding device in accordance with the embodiment of the present invention.

FIG. 2 is a diagram showing an example of the configuration of a video encoding device in accordance with the present embodiment. A video encoding device 1 includes a video encoding unit 110 for performing H.264/AVC encoding, an external memory 120 for storing a reconstructed image, an encoding controller 130 for performing determination of an encoding mode and the like, an AFF mode determining unit 140 for performing determination of an AFF mode, an original image generating unit 150 for generating an original image 10 from an input image 9 based on the determined AFF mode, a reconstructed image converting unit 160 for converting the reconstructed image in accordance with the AFF mode between the video encoding unit 110 and the external memory 120, and a memory bus 170 for connecting between the reconstructed image converting unit 160 and the external memory 120.

The video encoding unit 110 receives the original image 10 outputted from the original image generating unit 150 on a macroblock (MB) basis of 16×16 pixels, performs the H.264/AVC encoding by inter-frame prediction or intra-frame prediction in accordance with encoding mode information outputted from the encoding controller 130, and outputs a stream 11.

The encoding controller 130 receives encoding setting information S1 from the outside of the video encoding device 1 and information about encoding from the video encoding unit 110. The encoding setting information S1 is information for controlling the operation of the video encoding unit 110. Further, the encoding controller 130 outputs, to the video encoding unit 110, encoding mode selection information indicating an encoding mode of one of inter-frame prediction and intra-frame prediction.

The AFF mode determining unit 140 performs AFF mode determination based on the input image 9 inputted from the outside of the video encoding device 1 and motion vector (MV) information inputted from the video encoding unit 110, and outputs the determination result as AFF mode determination information.

The original image generating unit 150 converts the input image 9 inputted from the outside of the video encoding device 1 based on the AFF mode determination information outputted from the AFF mode determining unit 140, generates the original image 10, and outputs the original image 10 to the video encoding unit 110.

The reconstructed image converting unit 160 performs conversion of the reconstructed image data based on the AFF mode determination information outputted from the AFF mode determining unit 140 when the video encoding unit 110 performs writing and reading of the reconstructed image data to and from the external memory 120.

The video encoding unit 110 uses the external memory 120 to temporarily store the reconstructed image. That is, the external memory 120 buffers the reconstructed image outputted from the video encoding unit 110 via the memory bus 170. The external memory 120 includes a volatile memory such as a DRAM.

Hereinafter, main components will be described in detail.

(Video Encoding Unit 110)

Figure 3:
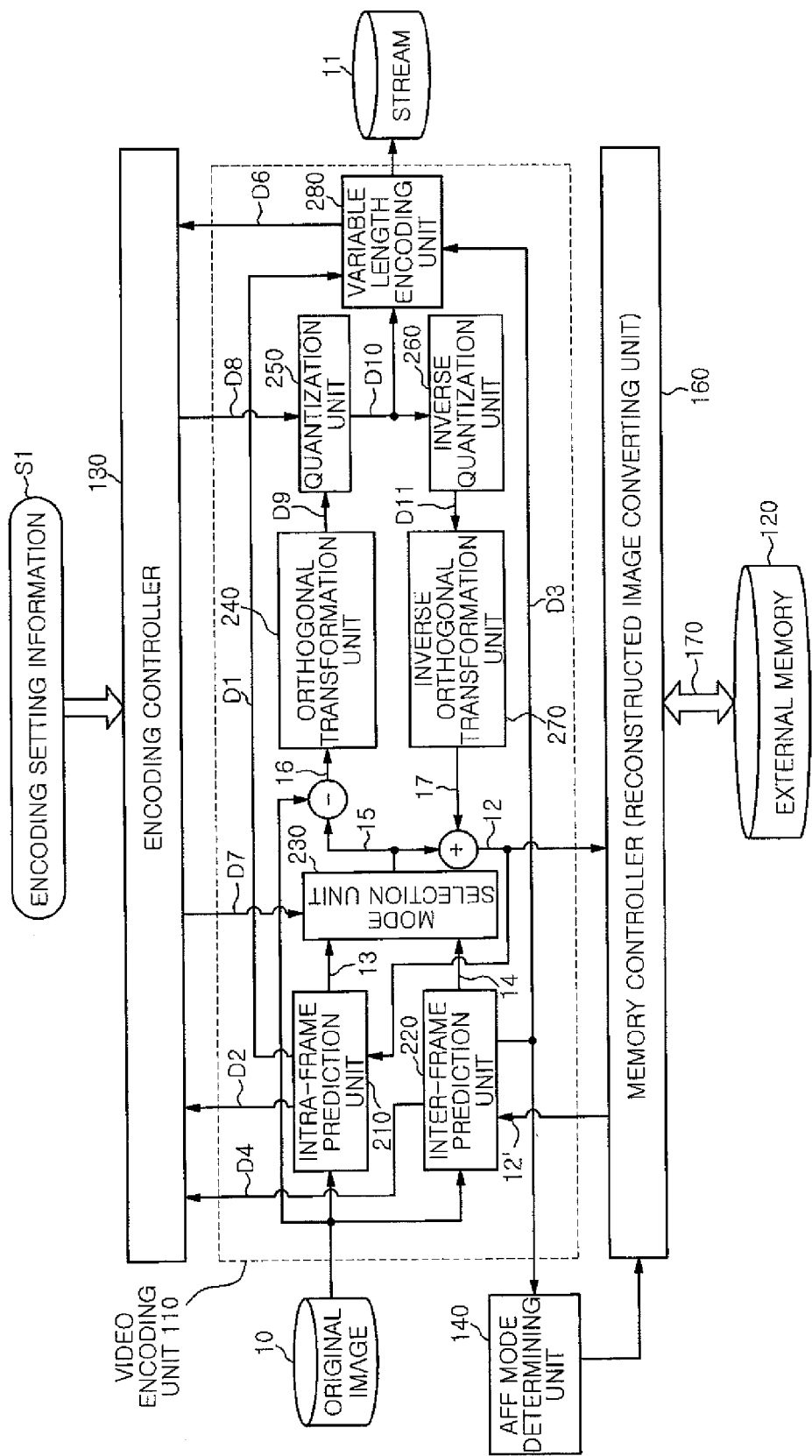
FIG. 3 is a diagram showing an example of the configuration of a video encoding unit 110.

Hereinafter, the video encoding unit 110 will be described in detail. FIG. 3 is a diagram showing an example of the configuration of the video encoding unit 110. (Further, in FIG. 3, components other than the video encoding unit 110 are also shown in order to represent a relationship between the video encoding unit 110 and the other components.)

As shown in FIG. 3, the video encoding unit 110 is configured to include an intra-frame prediction unit 210, an inter-frame prediction unit 220, a mode selection unit 230, an orthogonal transformation unit 240, a quantization unit 250, an inverse quantization unit 260, an inverse orthogonal transformation unit 270 and a variable length encoding unit 280.

The intra-frame prediction unit 210 receives the original image 10 outputted from the original image generating unit 150 (see FIG. 2) and a reconstructed image 12 around a current MB (macroblock in an encoding process). Then, the intra-frame prediction unit 210 generates intra-frame prediction information D1, an intra-frame prediction image 13 as a result of intra-frame prediction, and an intra-frame prediction error D2 indicating a difference between the original image 10 and the intra-frame prediction image 13. The intra-frame prediction information D1 is outputted to the variable length encoding unit 280, the intra-frame prediction image 13 is outputted to the mode selection unit 230, and the intra-frame prediction error D2 is outputted to the encoding controller 130.

The inter-frame prediction unit 220 receives the original image 10 outputted from the original image generating unit 150 (see FIG. 2) and a reconstructed image 12' generated from the original image 10 in the past or future (original image 10 inputted before or after the original image 10 under processing) in the reconstructed image converting unit 160. Further, the reconstructed image 12' is obtained by a memory controller (reconstructed image converting unit 160) reading out the reconstructed image 12 stored in the external memory 120.

Then, the inter-frame prediction unit 220 generates inter-frame prediction information D3 including motion vector information, an inter-frame prediction image 14 as a result of inter-frame prediction, and an inter-frame prediction error D4 indicating a difference between the original image 10 and the inter-frame prediction image 14. Then, the inter-frame prediction information D3 is outputted to the variable length encoding unit 280, the inter-frame prediction image 14 is outputted to the mode selection unit 230, and the inter-frame prediction error D4 is outputted to the encoding controller 130.

Further, the encoding controller 130 determines an encoding mode (inter-frame prediction or intra-frame prediction) in accordance with an encoding mode selection algorithm based on the intra-frame prediction error D2 outputted from the intra-frame prediction unit 210, the inter-frame prediction error D4 outputted from the inter-frame prediction unit 220 and code amount information D6 outputted from the variable length encoding unit 280. Then, the encoding controller 130 outputs, to the mode selection unit 230, encoding mode selection information D7 indicating the determined encoding mode. In addition, the encoding controller 130 determines a quantization coefficient D8 in accordance with a rate control algorithm, and outputs the quantization coefficient D8 to the quantization unit 250.

The encoding mode selection algorithm and the rate control algorithm used in the encoding controller 130 have a great influence on the code amount of the stream and image quality. Thus, there are various algorithms depending on the content of the original image 10 to be encoded or the application of video encoding.

In accordance with the encoding mode selection information D7, which is inputted from the encoding controller 130, indicating an encoding mode of one of intra-frame prediction and inter-frame prediction, the mode selection unit 230 outputs the intra-frame prediction image 13 as a prediction image 15 if the intra-frame prediction has been selected in the encoding mode selection information D7, and outputs the inter-frame prediction image 14 as the prediction image 15 if the inter-frame prediction has been selected in the encoding mode selection information D7.

The orthogonal transformation unit 240 performs an orthogonal transform process on a difference image 16 corresponding to a difference between the original image 10 and the prediction image 15 to generate frequency components D9, and outputs the frequency components D9 to the quantization unit 250.

The quantization unit 250 performs a quantization process on the frequency components D9 outputted from the orthogonal transformation unit 240 based on the quantization coefficient D8 outputted from the encoding controller 130, and outputs quantization values D10 with a reduced amount of information.

The inverse quantization unit 260 performs an inverse quantization process on the quantization values D10 to generate restored frequency components D11, and outputs the restored frequency components D11 to the inverse orthogonal transformation unit 270.

The inverse orthogonal transformation unit 270 performs an inverse orthogonal transform process on the restored frequency components D11 to generate and output a restored difference image 17. Then, the restored difference image 17 and the prediction image 15 selected by the mode selection unit 230 are combined to generate the reconstructed image 12, and the generated reconstructed image 12 is stored in the external memory 120.

The variable length encoding unit 280 encodes the quantization values D10 and the intra-frame prediction information D1 or inter-frame prediction information D3 into a data string having a smaller amount of data (variable length encoding), and outputs the data string as a stream 11. Also, the variable length encoding unit 280 outputs the code amount information D6 to the encoding controller 130. The code amount information D6 indicates the code amount of the stream 11 after variable length encoding.

(Original Image Generating Unit 150)

Figure 4A:
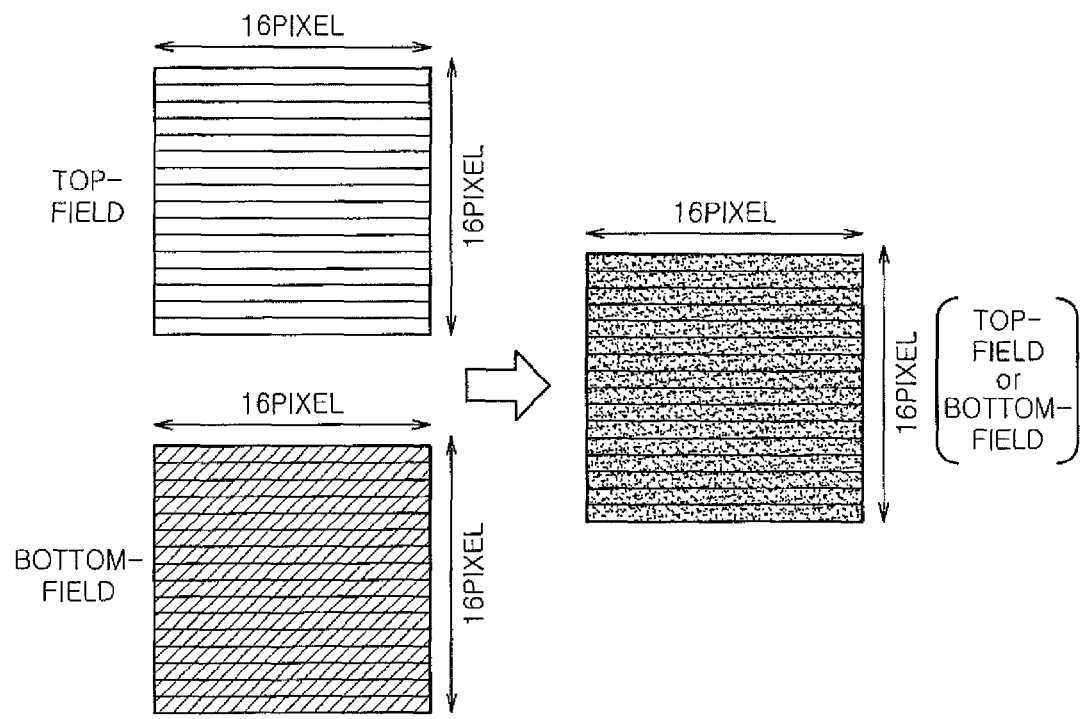
FIGS. 4A and 4B are diagrams for explaining the operation of an original image generating unit 150.
Figure 4B:
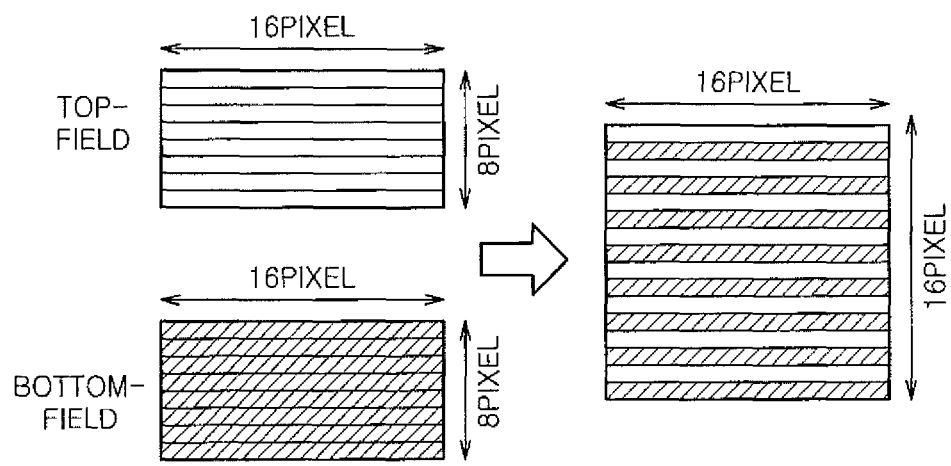

Hereinafter, the original image generating unit 150 will be described in detail. FIGS. 4A and 4B are diagrams for explaining the operation of the original image generating unit 150.

As described above, in the video encoding unit 110, an encoding process is performed on a macroblock basis of 16×16 pixels. The original image generating unit 150 receives the AFF mode determination information outputted from the AFF mode determining unit 140, converts the input image 9 in accordance with the AFF mode determination result indicated by the AFF mode determination information, and outputs it as the original image 10 on a macroblock basis.

If the input image 9 is an interlaced image, the original image generating unit 150 generates the original image 10 to be outputted in accordance with the AFF mode determination result of the AFF mode determining unit 140. In this case, if the AFF mode determination result indicates field coding, 16×16 pixels are cut out from either the top field or the bottom field of the input image 9 and outputted as the original image 10 on a macroblock basis (see FIG. 4A).

On the other hand, if the AFF mode determination result indicates frame coding, 16×8 pixels are cut out from both the top field and the bottom field and converted into 16×16 pixels by alternately arranging each line of the top field and each line of the bottom field. Then, the 16×16 pixels are outputted as the original image 10 on a macroblock basis (see FIG. 4B).

If the input image 9 is a progressive image, since the AFF process is not performed, 16×16 pixels are cut out regardless of the AFF mode determination result and outputted as the original image 10 on a macroblock basis.

Figure 5:
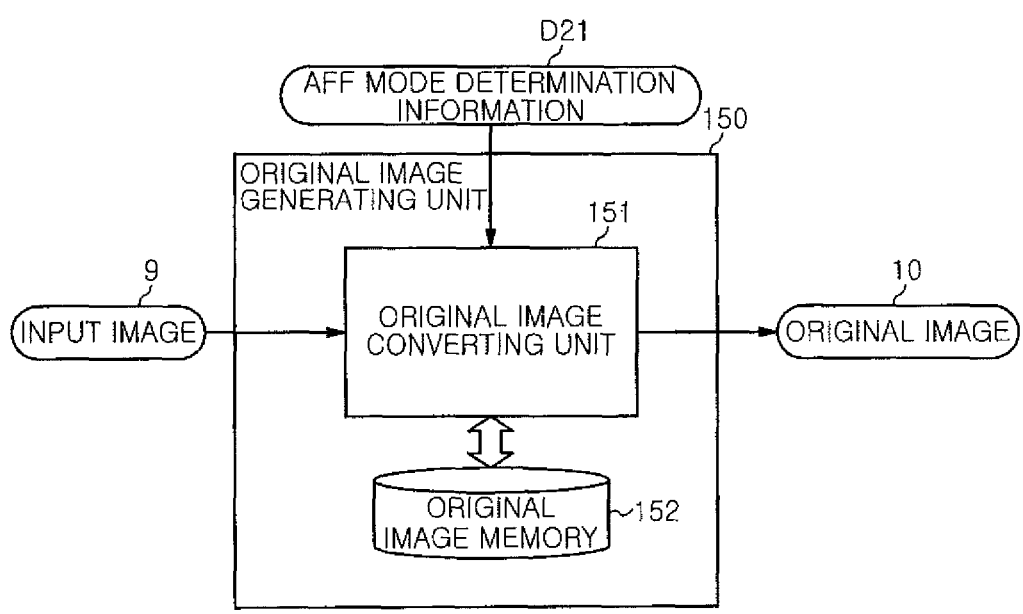
FIG. 5 is a diagram showing an example of the configuration of the original image generating unit 150.

FIG. 5 is a diagram showing an example of the configuration of the original image generating unit 150. The original image generating unit 150 is configured to include an original image converting unit 151 and an original image memory 152.

The original image memory 152, which is used only when the input image 9 is an interlaced image, is for buffering data of the original image 10 corresponding to one field.

The original image converting unit 151 converts the input image 9 in accordance with AFF mode determination information D21 outputted from the AFF mode determining unit 140 (see FIG. 2). Specifically, if the input image 9 is an interlaced image and a field coding mode has been selected in the AFF mode determination information D21, 16×16 pixels of either the top field or the bottom field of the input image 9 are read out from the original image memory 152, and outputted as the original image 10 on a macroblock basis.

On the other hand, if the input image 9 is an interlaced image and a frame coding mode has been selected in the AFF mode determination information D21, 16×8 pixels of both the top field and bottom field of the input image 9 are read out from the original image memory 152. Then, 16×16 pixels are obtained by alternately arranging each line of the top field and each line of the bottom field and outputted as the original image 10 on a macroblock basis.

Further, if the input image 9 is a progressive image, the original image converting unit 151 outputs 16×16 pixels of the input image 9 as the original image 10 as they are.

(Reconstructed Image Converting Unit 160)

Figure 6A:
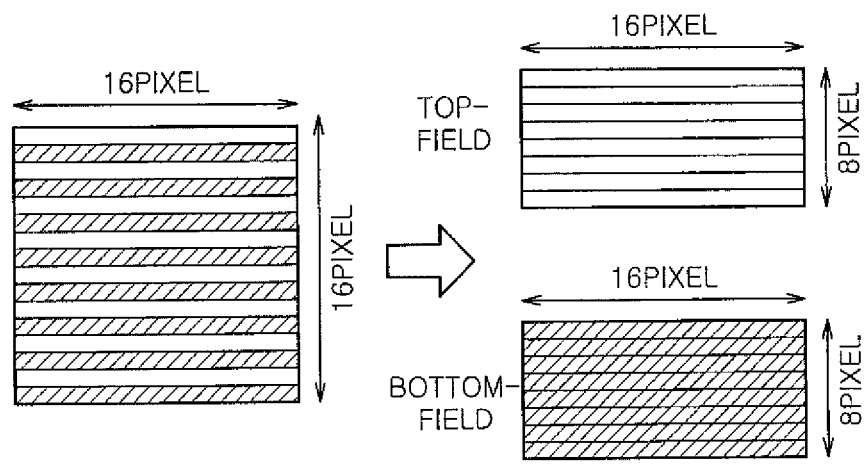
FIGS. 6A and 6B are diagrams for explaining an operation (write operation) of a reconstructed image converting unit 160.
Figure 6B:
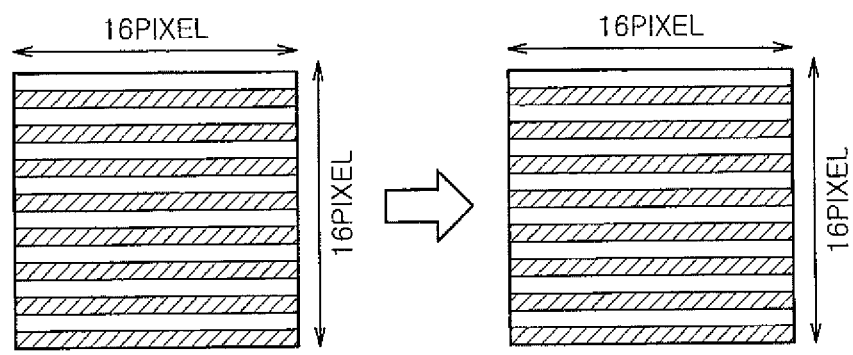
Figure 7A:
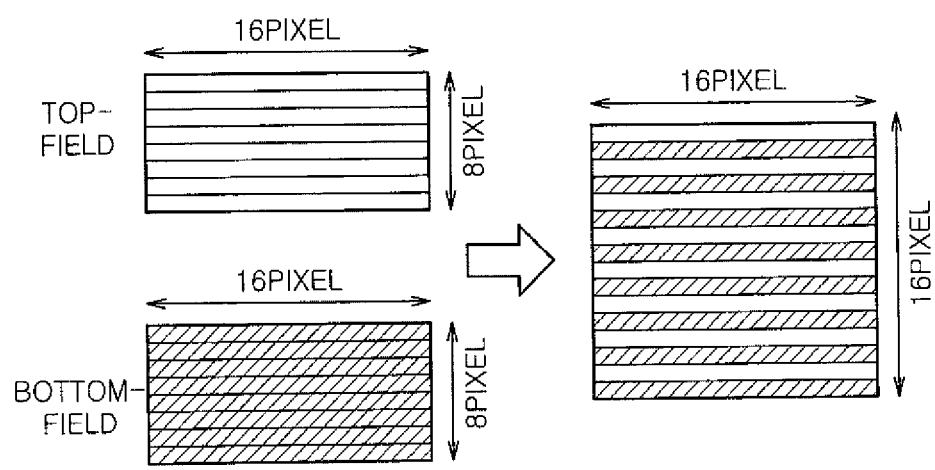
FIGS. 7A and 7B are diagrams for explaining an operation (read operation) of the reconstructed image converting unit 160.
Figure 7B:
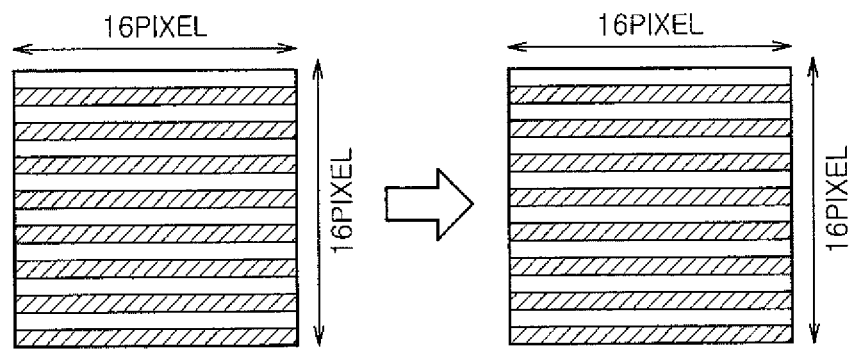

Hereinafter, the reconstructed image converting unit 160 will be described in detail. FIGS. 6 and 7 are diagrams for explaining operations of the reconstructed image converting unit 160. In the operations of the reconstructed image conversion, an operation of writing the reconstructed image 12 is shown in FIGS. 6A and 6B, and an operation of reading the reconstructed image 12 is shown in FIGS. 7A and 7B.

The reconstructed image converting unit 160 converts data of the reconstructed image 12 outputted from the video encoding unit 110 in accordance with the AFF mode determination information D21 outputted from the AFF mode determining unit 140 and writes the converted data to the external memory 120. Also, the reconstructed image converting unit 160 converts data of the reconstructed image read out at an appropriate timing from the external memory 120 and supplies the converted data to the video encoding unit 110.

(Writing Operation)

If the input image 9 is a progressive image, or if the input image 9 is an interlaced image and the AFF mode determination information D21 indicates a field coding mode, data of the reconstructed image 12 are written to the external memory 120 as they are without being converted (see FIG. 6B).

On the other hand, if the input image 9 is an interlaced image and the AFF mode determination information D21 indicates a frame coding mode, data of the reconstructed image 12 are divided into the top field and the bottom field and then written to the external memory 120 (see FIG. 6A).

(Reading Operation)

If the input image 9 is a progressive image, or if the input image 9 is an interlaced image and the AFF mode determination information D21 indicates a field coding mode, data of the reconstructed image 12 are read, as they are, from the external memory 120 (see FIG. 7B).

On the other hand, if the input image 9 is an interlaced image and the AFF mode determination information D21 indicates a frame coding mode, image data are read from two memory areas for the top field and bottom field, and outputted as one sheet of the reconstructed image 12 by alternately and sequentially arranging each line of each field (see FIG. 7A).

Figure 8:
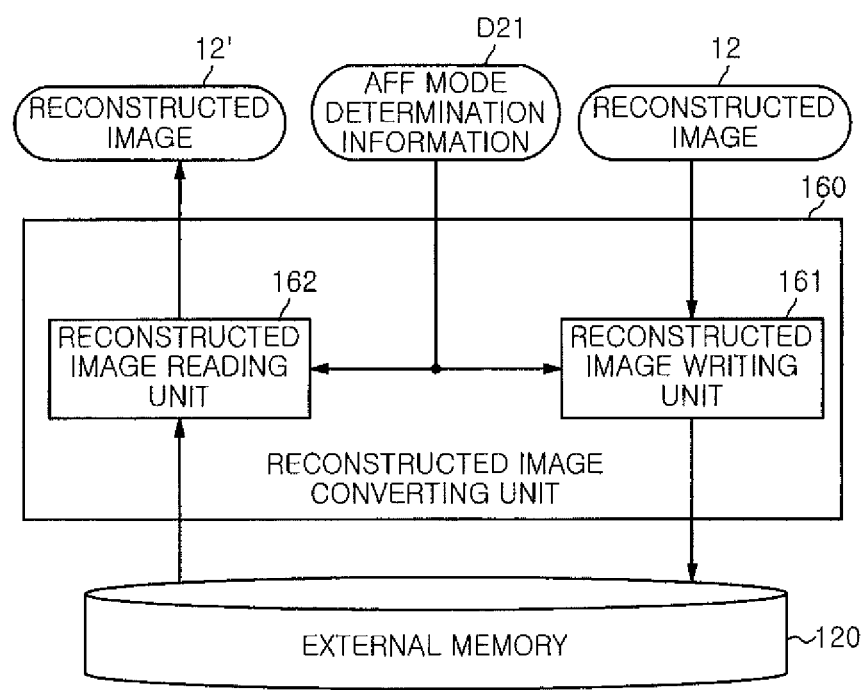
FIG. 8 is a diagram showing an example of the configuration of the reconstructed image converting unit 160.

FIG. 8 is a diagram showing an example of the configuration of the reconstructed image converting unit 160. The reconstructed image converting unit 160 is configured to include a reconstructed image writing unit 161 and a reconstructed image reading unit 162.

The reconstructed image writing unit 161 receives the AFF mode determination information D21, and converts data of the reconstructed image 12 outputted from the video encoding unit 110 in accordance with the AFF mode determination information D21 and writes the converted data to the external memory 120. Specifically, if the input image 9 is an interlaced image and the AFF mode determination information D21 indicates a frame coding mode, the received reconstructed image 12 is divided into the top field and the bottom field and then written to the external memory 120.

On the other hand, if the input image 9 is a progressive image, or if the input image 9 is an interlaced image and the AFF mode determination information D21 indicates a field coding mode, the reconstructed image 12 is written to the external memory 120 as it is.

The reconstructed image reading unit 162 converts data of the reconstructed image 12 read out from the external memory 120 in accordance with the AFF mode determination information D21, and outputs the converted data to the video encoding unit 110. Specifically, if the input image 9 is an interlaced image and the AFF mode determination information D21 indicates a frame coding mode, the reconstructed image reading unit 162 reads pixel values at the same pixel position of the top field and bottom field from the external memory 120, and outputs, as the reconstructed image 12, data obtained by alternately arranging the pixel values for each line of each field.

On the other hand, if the input image 9 is a progressive image or if the input image 9 is an interlaced image and the AFF mode determination information D21 indicates a field coding mode, the reconstructed image 12 read out from the external memory 120 is outputted to the video encoding unit 110 as it is.

(AFF Mode Determining Unit 140)

Hereinafter, an algorithm of AFF mode determination in the AFF mode determining unit 140 will be explained.

In the present embodiment, for example, in the AFF mode determination algorithm, there are used two schemes, i.e., a vertical pixel difference (VPD) scheme using texture information of the input image 9 and a motion vector (MV) scheme using MV information outputted from the inter-frame prediction unit 220.

The AFF mode determining unit 140 performs AFF mode determination by using these two schemes, determines a final AFF mode by integrating the determination results, and outputs AFF mode determination information.

(VPD Scheme)

First, as one scheme of the AFF mode determination algorithm, there will be explained a VPD scheme in which AFF mode determination is performed based on the texture information of the input image 9.

In the VPD scheme, AFF mode determination is performed by calculating two feature values, i.e., a frame difference (hereinafter, referred to "FRM difference") and a field difference (hereinafter, referred to "FLD difference") on a pixel-by-pixel basis from the texture information of the input image 9, and comparing the calculation results.

Figure 9:
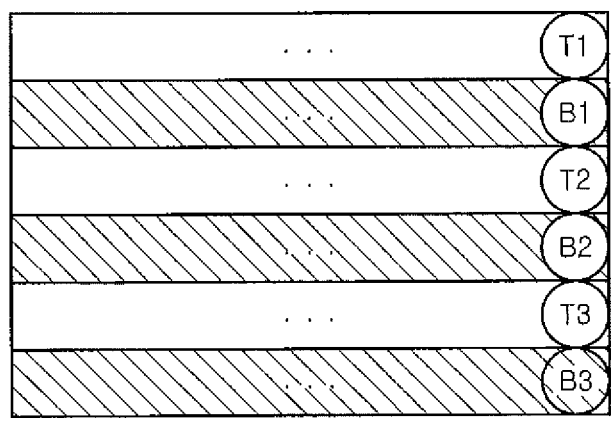
FIG. 9 is a diagram showing an example of arrangement of pixels used in the calculation of a FRM difference and a FLD difference in a VPD scheme.

As shown in FIG. 9, in the VPD scheme to be described below, as an example, the FRM difference and the FLD difference are calculated by using pixel values of pixels T1, B1, T2, B2, T3, B3 . . . of the respective fields arranged at the same position in a vertical direction in an image. Specifically, the FRM difference and the FLD difference may be calculated by the following Equations (1) and (2). Further, the following equations are intended to calculate the feature values (FRM difference and FLD difference) by a pixel difference for the position of the pixel Bn. (In Equations (1) and (2), VTn is the pixel value of the pixel Tn, VBn is the pixel value of the pixel Bn, and abs(x) is the absolute value of x.)

$$FRM \text{ difference} = (\text{abs}(V_{Tn+1} - V_{Bn}) + \text{abs}(V_{Bn} - V_{Tn}))/2 \quad \text{Equation (1)}$$

$$FLD \text{ difference} = \text{abs}(V_{Bn+1} - V_{Bn}) \quad \text{Equation (2)}$$

Figure 10:
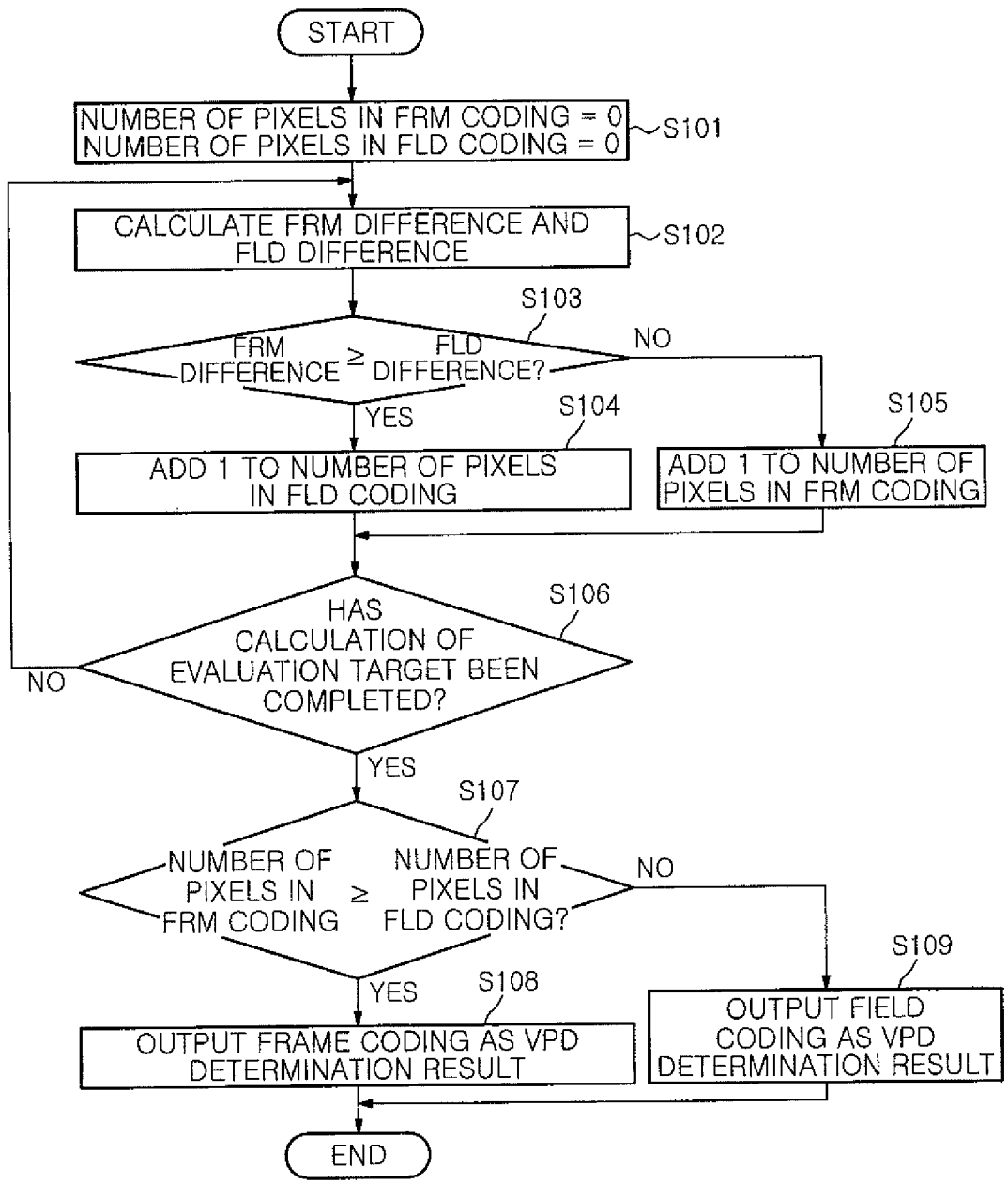
FIG. 10 is a flowchart showing an example of a process flow of AFF mode determination of the VPD scheme.

An example of a process flow of AFF mode determination of the VPD scheme is shown in FIG. 10.

First, initial values are set as follows: the number of pixels (votes) in FRM coding=0; the number of pixels (votes) in FLD coding=0 (step S101).

The FRM difference and the FLD difference are calculated by the above Equations (1) and (2) (step S102). After comparing the FRM difference with the FLD difference calculated in step S102, if the FRM difference is equal to or greater than the FLD difference (step S103), 1 is added to the number of pixels in FLD coding (step S104), and if the FRM difference is smaller than the FLD difference (step S103), 1 is added to the number of pixels in FRM coding (step S105).

A process of steps S102 to S105 is repeated for pixel values in one frame if it is a determination in picture adaptive field/frame coding (PAFF), and for pixel values within an evaluation target range of 16×32 pixels if it is a determination in macroblock adaptive field/frame coding (MBAFF) (step S106).

If the evaluation of the evaluation target is completed, the number of pixels in FRM coding is compared with the number of pixels in FLD coding. If the number of pixels in FRM coding is equal to or greater than the number of pixels in FLD coding (step S107), "frame coding" is outputted as a VPD determination result (step S106). If the number of pixels in FRM coding is smaller than the number of pixels in FLD coding (step S107), "field coding" is outputted as a VPD determination result (step S109). The outputted VPD determination result is used for integration determination to be described later.

Further, Equations (1) and (2) for calculating the FRM difference and the FLD difference in the VPD scheme is intended to calculate a difference of texture in the frame coding and the field coding. Therefore, equations other than Equations (1) and (2) may be used as long as this intention is achieved. For example, the following equations may be employed. The following equations are intended to calculate the feature values (FRM difference and FLD difference) by a pixel difference for the position of the pixel Bn.

$$FRM \text{ difference} = \text{abs}(V_{Tn+1} - V_{Bn}) \quad \text{Equation (3)}$$

$$FLD \text{ difference} = \text{abs}(V_{Bn} - V_{Bn-1}) \quad \text{Equation (4)}$$

Figure 11:
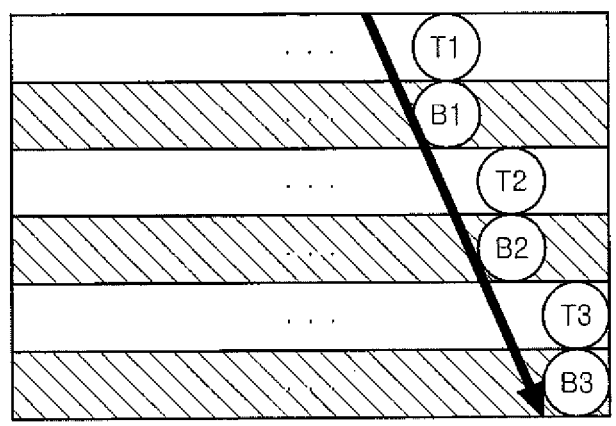
FIG. 11 is a diagram showing an example of arrangement of pixels used in the calculation of the FRM difference and the FLD difference in the VPD scheme.

Further, the pixel values used in the calculation using the above Equations (1) to (4) of the FRM difference and the FLD difference of the VPD scheme are for calculating the difference of texture in the frame coding and the field coding. Accordingly, as long as this intention is achieved, the pixel values do not necessarily have to be pixel values of pixels arranged in the vertical direction in the image. For example, as shown in FIG. 11, the pixel values may be pixel values of pixels T1, B1, T2, B2, T3, B3 arranged in a diagonal direction in the image.

Figure 12:
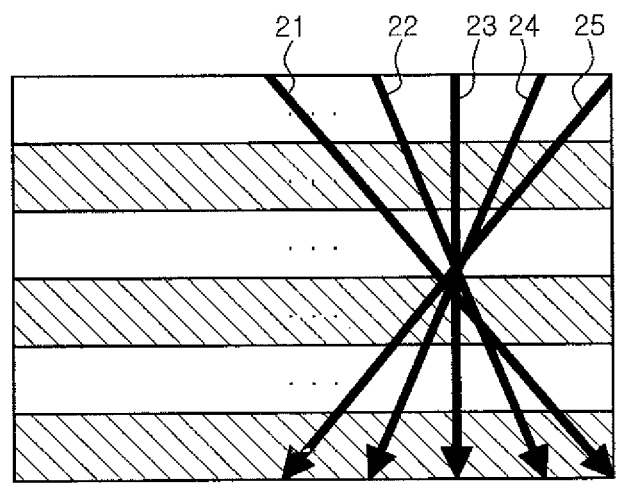
FIG. 12 is a diagram showing an example of arrangement of pixels used in the calculation of the FRM difference and the FLD difference in the VPD scheme.

Further, similarly, as shown in FIG. 12, among pixel columns arranged in different directions 21 to 25 in the image, the pixel difference of the pixel column having the smallest pixel difference may be used as a feature value. In this way, by using, as the feature value, the pixel difference in the direction in which the pixel difference becomes smaller, in a case where there is an edge in evaluation pixels, the feature value obtained along the edge is used in the determination. This brings an advantage of improving the quality of the edge which generally can be seen easily by the human eyes.

(MV Scheme)

In the MV scheme, AFF mode determination is performed by receiving a motion vector (hereinafter, referred to "MV") of the previous picture from the inter-frame prediction unit 220, and comparing the magnitude of the motion vector with a critical value (hereinafter, referred to "MV critical value"). Hereinafter, the AFF mode determination using the MV scheme will be explained.

Figure 13:
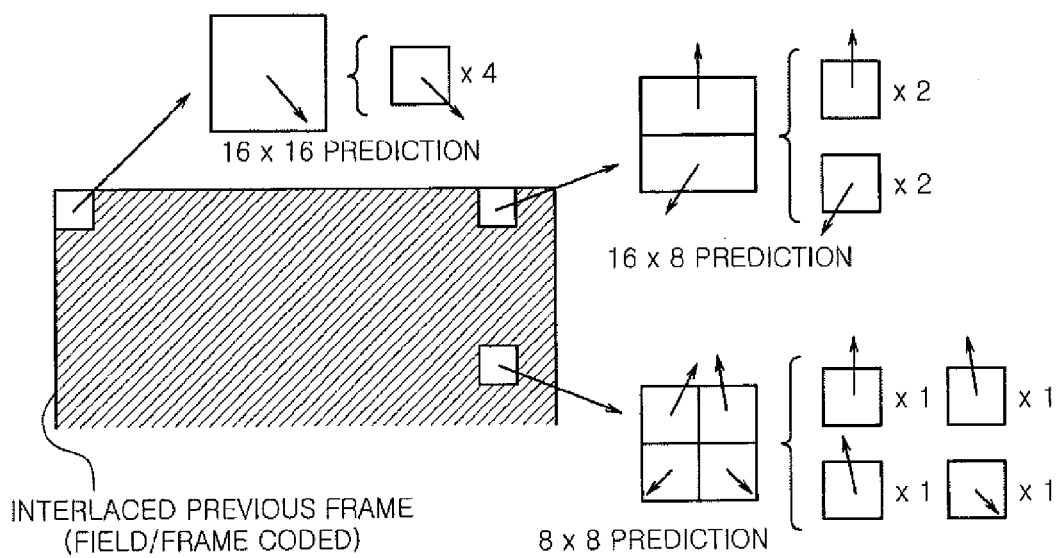
FIG. 13 is a diagram showing the concept of MV derivation on an 8×8 pixel block basis in the MV scheme.

First, the AFF mode determining unit 140 obtains the motion vector (MV) from the inter-frame prediction unit 220. In this case, the MV is obtained on an 8×8 pixel block basis. FIG. 13 is a diagram showing the concept of MV derivation on an 8×8 pixel block basis in the MV scheme.

Specifically, if the MV of a 16×16 pixel block is one, the MV of the 16×16 pixel block is assigned to each 8×8 pixel block (see (a) of FIG. 13). With regard to the MV of an 8×16 pixel block or 16×8 pixel block, the MVs corresponding to the number of 8×8 pixel blocks are assigned (see (b) of FIG. 13).

With regard to a 4×4 pixel block, a 4×8 pixel block and an 8×4 pixel block, the MV is obtained by averaging the MVs of 4×4 pixel block units included in each 8×8 pixel block (see (c) of FIG. 13).

Further, the MV may be one that has been frame-coded or field-coded. Further, although the MV is obtained on an 8×8 pixel block basis in the example of FIG. 13, but it is not limited thereto. The MV may be obtained on a 4×4 pixel block basis or on a 16×16 pixel block basis.

Next, a motion vector cost MVCost will be calculated by the following Equation (5).

$$MVCost = Wx*MVx + Wy*MVy \qquad \text{Equation (5)}$$

In Equation (5), MVx is the x coordinate of the MV, MVy is the y coordinate of the MV, and Wx and Wy are weights of MVx and MVy, respectively. Although the weights Wx and Wy can be set to any values, since a motion in the vertical direction in the image is more important than a motion in the horizontal direction in the image in the AFF mode determination, it is preferable that Wy is set to a value greater than Wx (e.g., Wx=0.5 and Wy=1)

Figure 14:
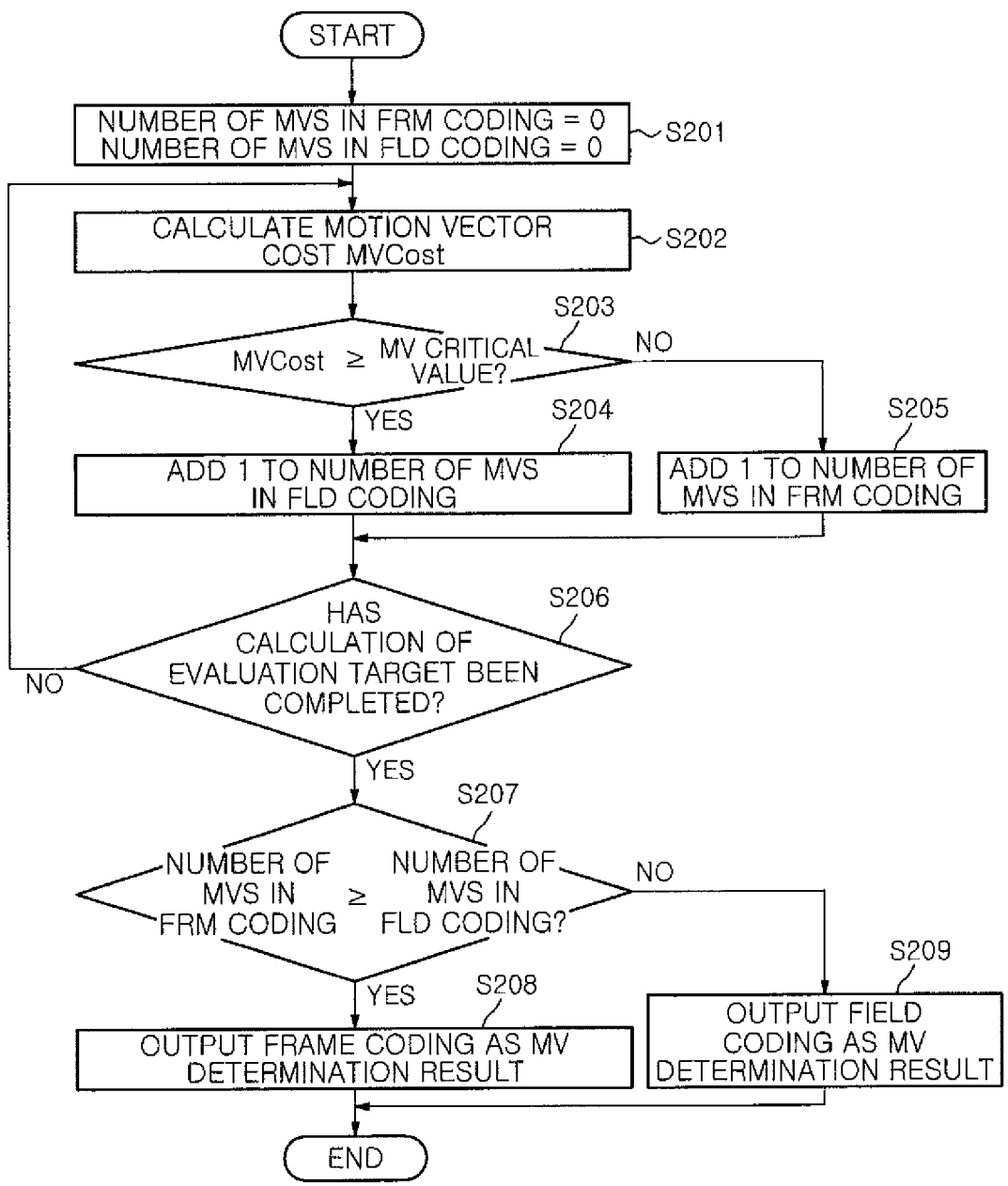
FIG. 14 is a flowchart showing an example of a process flow of AFF mode determination of the MV scheme.

An example of a process flow of AFF mode determination of the MV scheme is shown in FIG. 14.

First, initial values are set as follows: the number of MVs in FRM coding=0; the number of MVs in FLD coding=0 (step S201).

Then, the motion vector cost MVCost is calculated by the above Equation (5) (step S202). If the MVCost is smaller than the MV critical value (step S203), 1 is added to the number of MVs in FRM coding (step S205). If the MVCost is equal to or greater than the MV critical value (step S203), 1 is added to the number of MVs in FLD coding (step S204). In this scheme, by utilizing the fact that the FLD coding provides higher encoding efficiency than the FRM coding in the image having a large motion in the vertical direction, it is intended to evaluate whether the number of motion vectors suitable for FRM coding is larger or the number of motion vectors suitable for FLD coding is larger. In addition, since a value suitable for the MV critical value in step S203 is different depending on the image size, it is preferable to set the value through an external device of the video encoding device 1.

A process of steps S202 to S205 is repeated for the MVs of one frame if it is a determination in picture adaptive field/frame coding (PAFF), and for the MVs of pixel blocks within an evaluation target range of 16×32 pixels if it is a determination in macroblock adaptive field/frame coding (MBAFF) (step S206).

If the evaluation of the evaluation target has been completed, the number of MVs in FLD coding is compared with the number of MVs in FRM coding. If the number of MVs in FRM coding is equal to or greater than the number of MVs in FLD coding (step S207), "frame coding" is outputted as a MV determination result (step S208), and if the number of MVs in FRM coding is smaller than the number of MVs in FLD coding (step S207), "field coding" is outputted as a MV determination result (step S209). The outputted MV determination result is used for integration determination to be described later.

Further, the above Equation (5) for calculating the MVCost is intended to calculate the magnitude of the MV. Therefore, other equations may be used as long as it is possible to calculate the magnitude of the MV. For example, the following equation may be employed.

$$MVCost = \sqrt{Wx*MVx^2 + Wy*MVy^2)} \qquad \text{Equation (6)}$$

In the above-described MV scheme, since a mechanism such as a conventional video encoding device can be used, it is advantageous in that the implementation cost is low, and the processing amount hardly increases as compared with the conventional video encoding device.

(Integration Determination of VPD Scheme and MV Scheme)

In the present embodiment, the AFF mode determining unit 140 performs AFF mode determination by the above-described VPD scheme and MV scheme, and determines a final AFF mode by integrating the determination results thereof.

Figure 15:
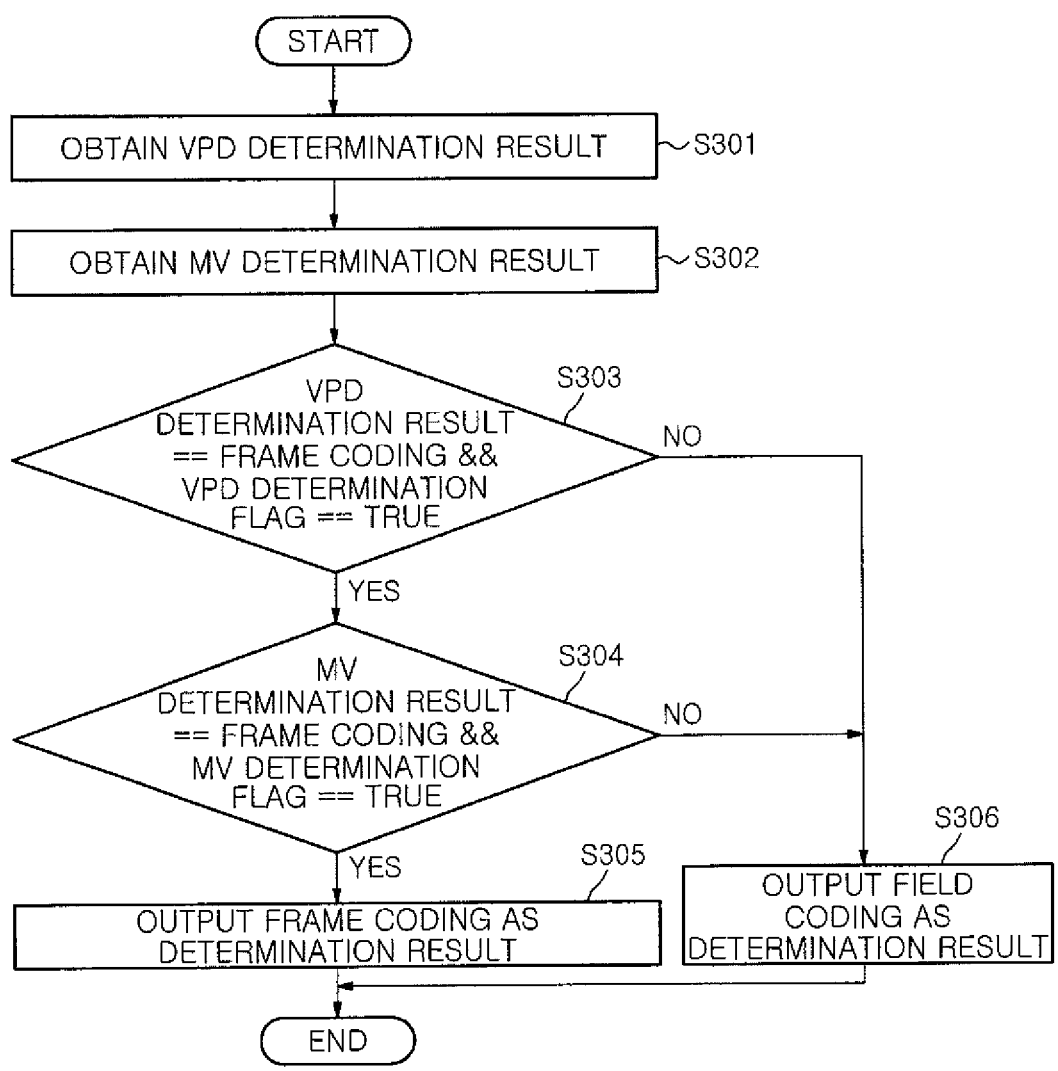
FIG. 15 is a flowchart showing an example of a process flow of integration determination of an AFF mode.

FIG. 15 is a flowchart showing an example of a process flow of integration determination.

First, the VPD determination result is obtained (step S301). Specifically, this step has the same process as shown in FIG. 10. Further, the MV determination result is obtained (step S302). Specifically, this step has the same process as that shown in FIG. 14.

The AFF mode determining unit 140 has a VPD enable (VPD determination flag) indicating whether the VPD determination result obtained in step S301 is valid or invalid, and a MV enable (MV determination flag) indicating whether the MV determination result obtained in step S302 is valid or invalid. In the following process, final AFF mode determination is carried out in accordance with the VPD determination result, the MV determination result, and the VPD determination flag and the MV determination flag (steps S303 and S304).

If both of the VPD determination result and the MV determination result are "frame coding," "frame coding" is outputted as a result of final AFF mode determination (step S305).

If the VPD determination result is "frame coding" and the MV determination result is "field coding," "frame coding" is outputted when the VPD determination flag is enabled (step S305), and "field coding" is outputted when the VPD determination flag is disabled (step S306).

If the VPD determination result is "field coding" and the MV determination result is "frame coding," "frame coding" is outputted when the MV determination flag is enabled (step S305), and "field coding" is outputted when the MV determination flag is disabled (step S306).

If both of the VPD determination result and the MV determination result are "field coding," "field coding" is outputted as a result of final AFF mode determination (step S306).

Figure 16:
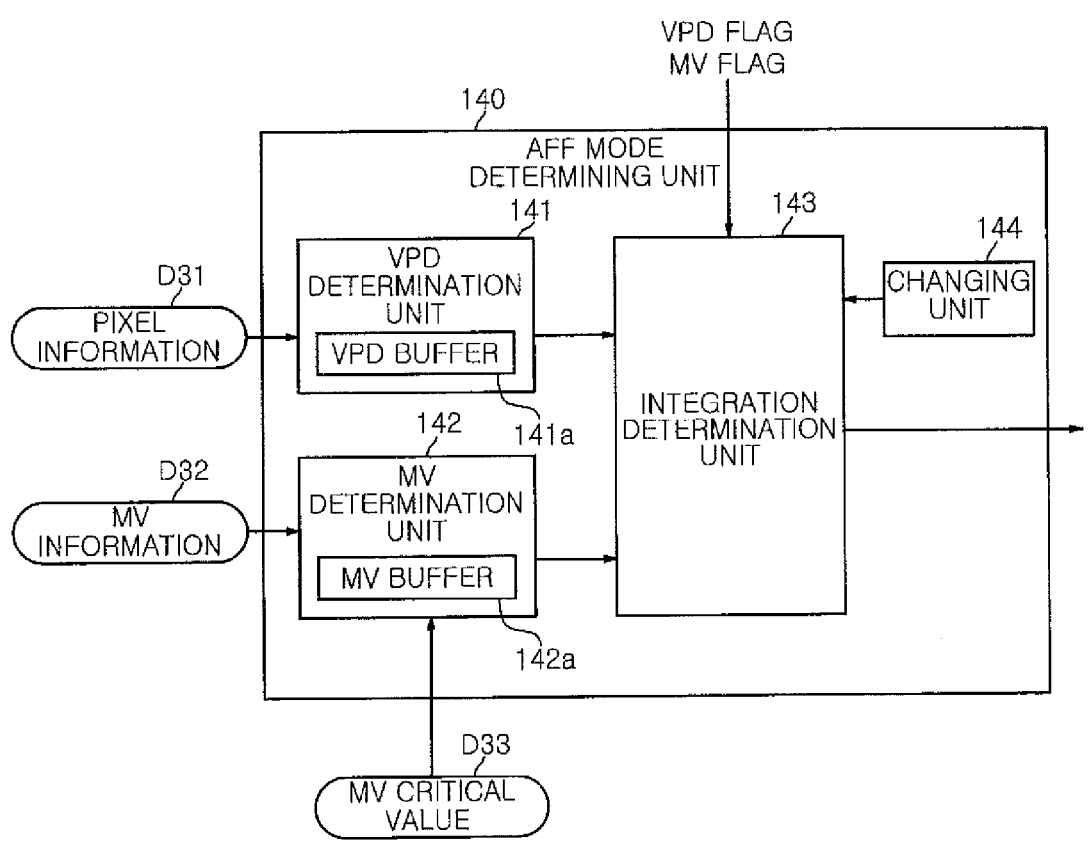
FIG. 16 is a diagram showing an example of the configuration of an AFF mode determining unit 140.

FIG. 16 is a diagram showing an example of the configuration of the AFF mode determining unit 140. The AFF mode determining unit 140 is configured to include a VPD determination unit 141, a MV determination unit 142, an integration determination unit 143, and a changing unit 144.

The VPD determination unit 141 buffers pixel information D31 to a VPD buffer 141a, performs the AFF mode determination process shown in FIG. 10 in accordance with the VPD scheme, and outputs a VPD determination result as a result of the determination.

The MV determination unit 142 buffers MV information D32, inputted from the inter-frame prediction unit 220 of the video encoding unit 110, to a MV buffer 142a, performs the AFF mode determination process shown in FIG. 14 in accordance with the MV scheme using a MV critical value D33 inputted from the encoding controller 130, and outputs a MV determination result as a result of the determination.

The integration determination unit 143 receives a VPD flag (VPD enable) signal and a MV flag (MV enable) signal from the encoding controller 130. Then, the integration determination unit 143 outputs a result of final AFF mode determination in accordance with an integration determination algorithm shown in FIG. 15 based on the VPD flag signal and the MV flag signal, the VPD determination result from the VPD determination unit 141, and the MV determination result from the MV determination unit 142.

The changing unit 144 changes the setting for AFF mode determination in the integration determination unit 143. For example, the changing unit 144 may automatically change the weights (e.g., weights Wvpd and Wmv in Equation (7) which will be described later) for the VPD determination result in the VPD determination unit 141 and the MV determination result in the MV determination unit 142 in accordance with the operation setting of the video encoding device 1. Further, it may be changed manually by receiving an input operation of the user.

In accordance with AFF mode determination method described above, by combining two AFF mode determination schemes (VPD scheme and MV scheme) having different principles, appropriate mode selection can be performed even for poor quality of input image or under poor encoding conditions in each scheme, thereby improving the encoding efficiency.

However, in the VPD scheme and the MV scheme, besides the above-described method, various algorithms may be selected in accordance with information that can be used in the AFF mode determination, a delay occurring in the AFF mode determination process or the like. Hereinafter, a modification example of the AFT mode determination method will be described.

(Modification Example of AFF Mode Determination Method)

Hereinafter, there will be described a method of using weights in the integration determination algorithm executed in the integration determination unit 143 (hereinafter referred to as "weighted integration determination").

Specifically, the integration determination unit 143 performs AFF mode evaluation using the following equation, based on the number of pixels in FRM coding and the number of pixels in FLD coding of the VPD scheme, and the number of MVs in FRM coding and the number of MVs in FLD coding of the MV scheme (in the following Equation (7), Wvpd is a weighting factor for the VPD scheme, and Wmv is a weighting factor for the MV scheme).

$$Wvpd*FRM \text{ coding pixel number} + Wmv*FRM \text{ coding } MV \text{ number} \leq Wvpd*FLD \text{ coding pixel number} + Wmv*FLD \text{ coding } MV \text{ number} \quad \text{Equation (7)}$$

As a result of final AFF mode determination, the integration determination unit 143 selects "field coding" if the above Equation (7) is satisfied, and selects "frame coding" if the above Equation (7) is not satisfied.

In accordance with the weight-based integration determination of the present embodiment, it is possible to improve efficiency of the encoding process by specifying appropriate weighting factors Wvpd and Wmv in accordance with the image size or encoding process conditions.

Meanwhile, in the MV scheme, since the MV that is an inter-frame prediction result is used for the determination, there is a feature that the MV of the current picture under the encoding process cannot be used. For this reason, in the MV scheme, it is more necessary to use the inter-frame prediction result of the previous picture as the delay between a timing at which the AFF mode determination is performed and an operation timing of the inter-frame prediction process becomes larger. Thus, the accuracy of the AFF mode determination may be deteriorated.

On the other hand, in the VPD scheme, since the input image 9 is used for the AFF mode determination, it is necessary to provide an internal buffer for holding pixels constituting the input image 9. Further, since the pixels are held in accordance with the evaluation unit of the AFF mode evaluation, there is a feature that a larger buffer is required as the image size increases.

Therefore, in the VPD scheme, if the available pixel buffer size is determined, the number of vertical pixel lines that can be ensured is changed depending on the image size. Accordingly, the number of vertical pixel lines that can be ensured decreases as the image size increases, and thus the accuracy of the AFF mode determination may be deteriorated.

Therefore, when using the weight-based integration determination in the integration determination algorithm, weighting factors of the VPD scheme and the MV scheme of the weight-based integration determination are changed by the changing unit 144 depending on the image size or the amount of delay required by the user during the operation of the video encoding device 1. Accordingly, it is possible to prevent the deterioration of the accuracy of the AFF mode determination.

Hereinafter, an example of a method of changing a weighting factor will be described.

In this example, the image size that affects the VPD scheme is one selected from 1920×1080 and 720×480 pixels.

Further, this example has a buffer for buffering 16 pixels in one vertical pixel line for each MB in the image of 1920×1080 pixels. In this case, in the image of 720×480 pixels, since a ratio of the image size is about ⅙, the buffer having the same capacity can buffer 96 pixels in six vertical pixel lines for each MB.

Therefore, in the VPD scheme, when the image size is 720×480 pixels rather than 1920×1080 pixels, the AFF mode determination can be achieved with higher accuracy.

Here, for example, by designating the weighting factor Wvpd of the VPD scheme as "1" when the image size is 1920×1080 pixels, and as "2" when the image size is 720×480 pixels, it is possible to cope with a difference in the accuracy of AFF mode determination due to the image size.

Further, in this embodiment, the delay amount that affects the MV scheme is one selected from one-frame delay and two-frame delay.

In the case of the one-frame delay, in the MV scheme, the MV of the inter-frame prediction result of the picture that is two frames (=1 frame+1 frame) earlier than the current picture is used. On the other hand, in the case of the two-frame delay, in the MV scheme, the MV of the inter-frame prediction result of the picture that is three frames (=1 frame+2 frames) earlier than the current picture is used.

Therefore, in the MV scheme, AFF mode determination with the higher accuracy is achieved in the one-frame delay rather than the two-frame delay.

Here, for example, by designating the weighting factor Wmv of the MV scheme as "4" in the case of the one-frame delay, and as "3" in the case of the two-frame delay, it is possible to cope with a difference in the accuracy of AFF mode determination caused by the required delay time.

In this way, with respect to the weight-based integration determination of the VPD scheme and the MV scheme, values of the weighting factors Wvpd and Wmv are changed by the changing unit 144 in accordance with the operating parameters of the video encoding device 1 that affects each scheme. Accordingly, it is possible to perform the AFF mode determination with high accuracy, thereby improving the encoding efficiency.

Further, as the factors affecting the weighting factors of the weight-based integration determination, the pixel buffer size and the delay amount have been provided in the above modification example, but they are not limited thereto. Other factors are applicable as long as they affect the accuracy of determination of the VPD scheme and the MV scheme.

Also, the values of the weighting factors Wvpd and Wmv of the VPD scheme and the MV scheme are not limited to the numerical values represented in the above description, and may be other values.

In accordance with the above AFF mode determination method, by assigning the weights to the results of the AFF mode determination of the two schemes depending on the required determination accuracy or encoding delay, it is possible to select an appropriate AFF mode determination method in accordance with the purpose. Thus, it is possible to further improve the encoding efficiency.

(Hardware Configuration of Video Encoding Device)

Figure 17:
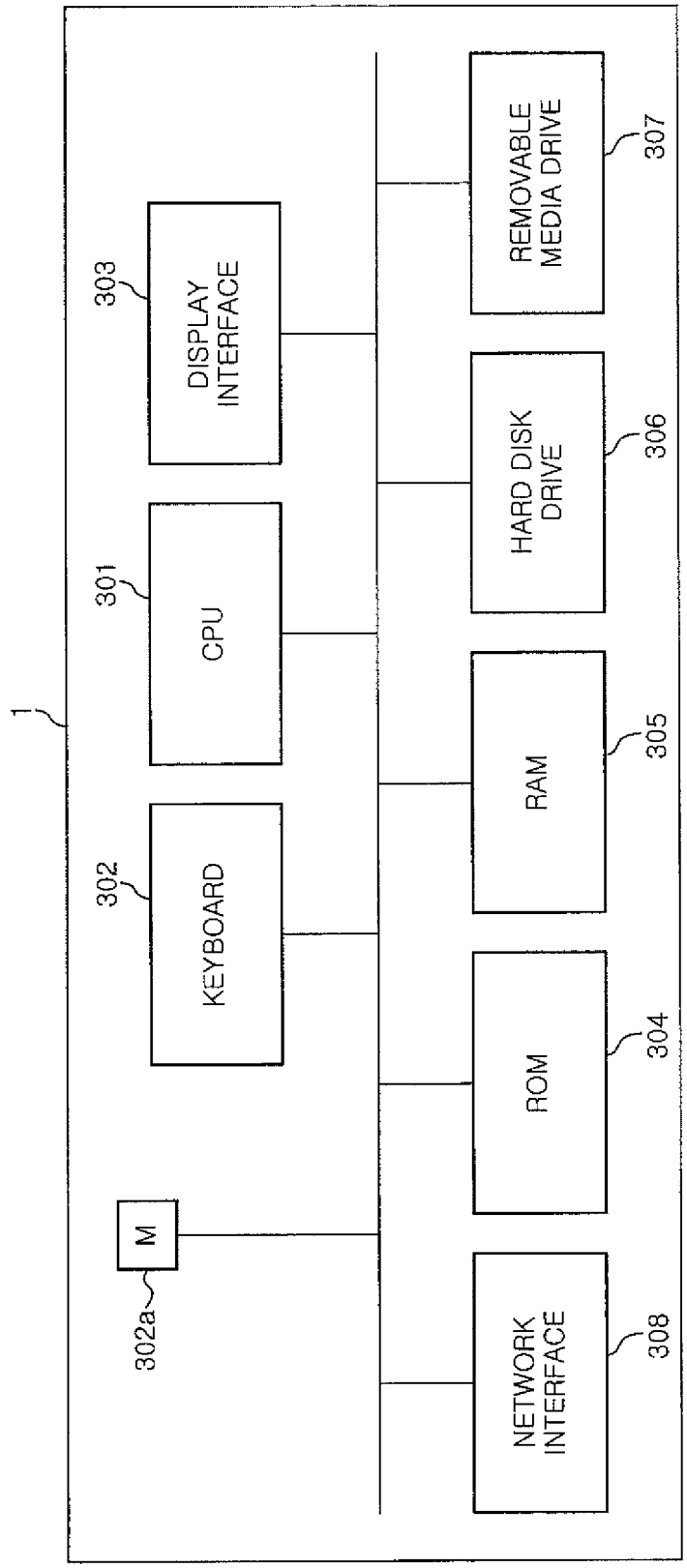
FIG. 17 is a block diagram illustrating an example of the hardware configuration of the video encoding device in accordance with the embodiment of the present invention.
Figure 18:
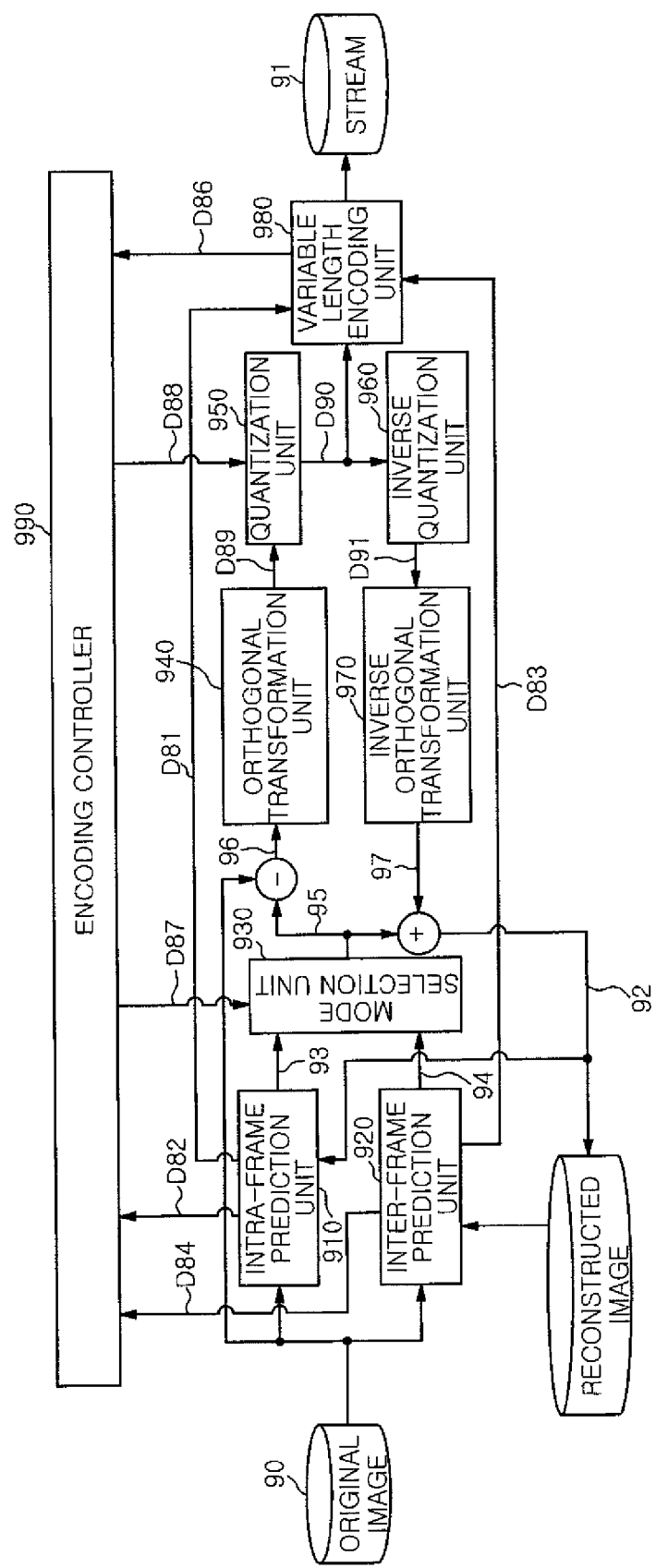
FIG. 18 is a diagram showing a configuration of a conventional video encoding device for performing a H. 264/AVC encoding process.
Figure 19A:
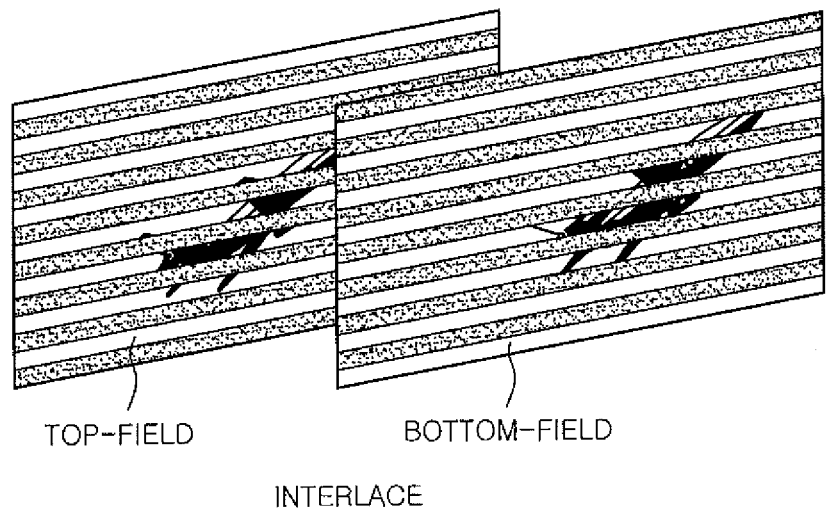
FIGS. 19A and 19B are diagrams illustrating an interlaced image and a progressive image.
Figure 19B:
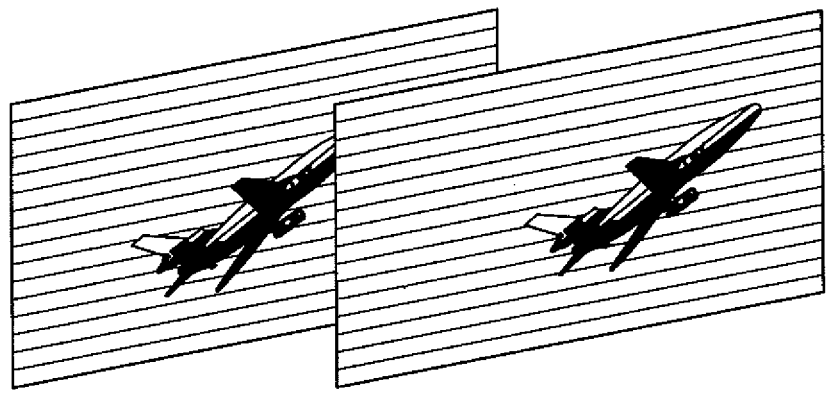
Figure 20:
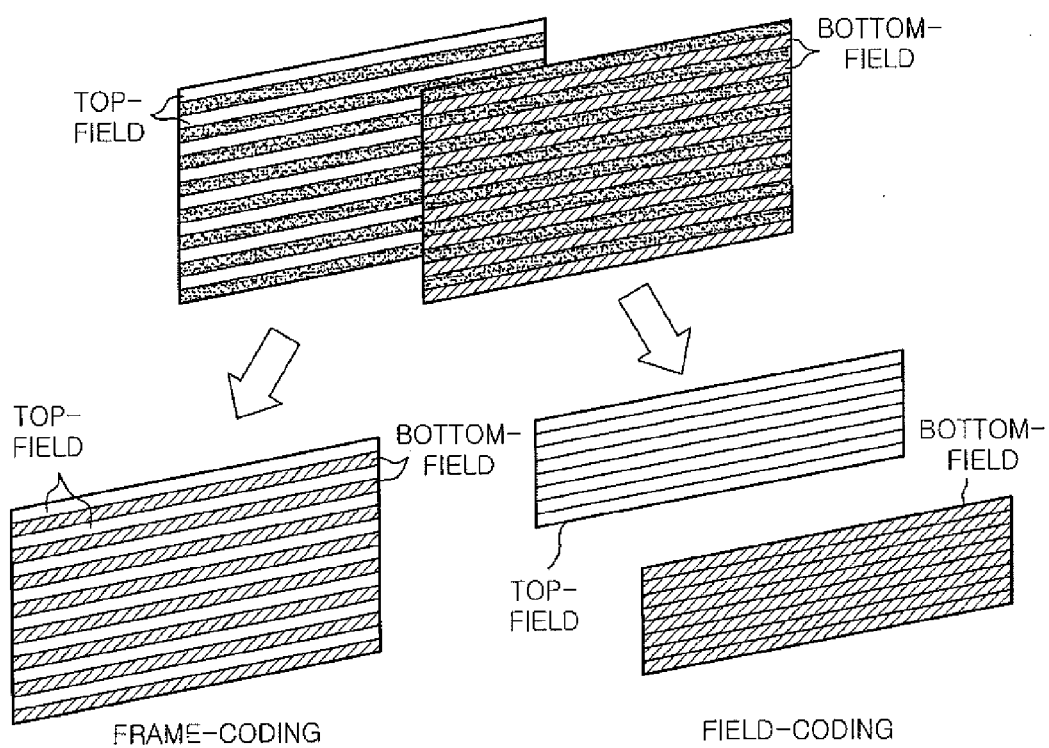
FIG. 20 is a diagram illustrating adaptive field frame coding of conventional H.264/AVC.
Figure 21:
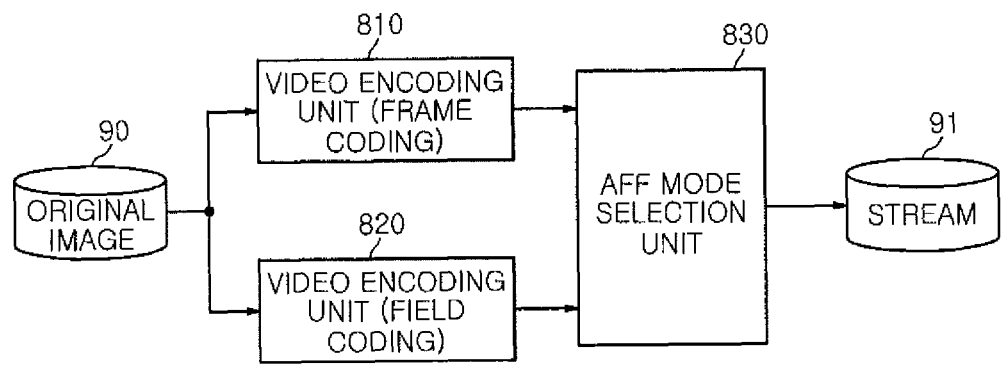
FIG. 21 is a diagram showing an outline of an encoding mode determination method of the conventional AFF.
Figure 22:
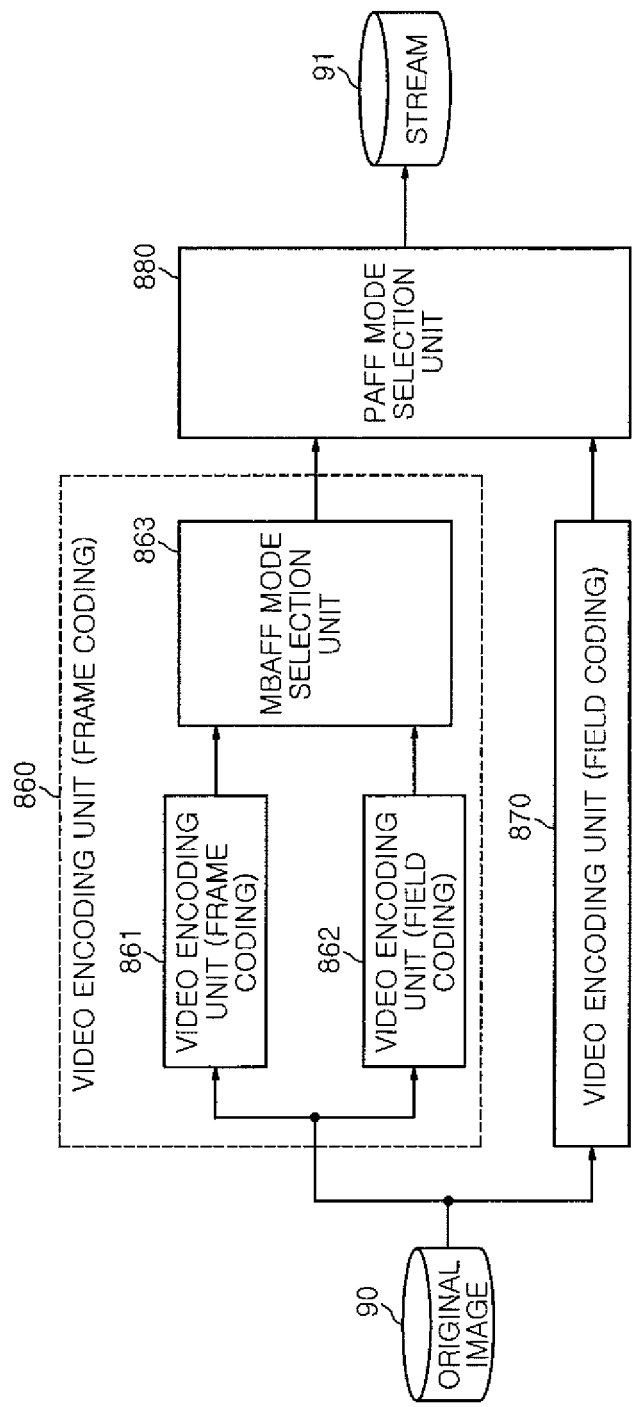
FIG. 22 is a diagram showing an outline of an encoding mode determination method in conventional PAFF and MBAFF.

FIG. 17 is a block diagram illustrating an example of the hardware configuration of the video encoding device in accordance with the present embodiment. In the video encoding device 1 that is a computer device shown in FIG. 17, a CPU 301 controls the entire system in accordance with the program stored in a ROM 304 and/or hard disk drive 306 while using a RAM 305 as a working memory for primary storage.

Accordingly, there is realized the process in the video encoding unit 110, the encoding controller 130, the AFF mode determining unit 140, the original image generating unit 150 and the reconstructed image converting unit 160 in the video encoding device in accordance with the present embodiment. Further, the external memory 120 in the video encoding device in accordance with the present embodiment may be realized by the RAM 305, the hard disk drive 306 or the like.

Further, the input image 9, the original image 10, the stream 11, the reconstructed image 12, the encoding setting information S1, the AFF mode determination information D21, the pixel information D31, the motion vector (MV) information D32, the MV critical value D33, and other data are stored in the storage area of the RAM 305, the hard disk drive 306 or the like.

Further, the CPU 301 may perform the setting change of various data in the video encoding process in accordance with the present embodiment on the basis of the program stored in the hard disk drive 306 in accordance with the instructions of the user inputted through a mouse 302a or keyboard 302. A display interface 303 is connected to a display such as a CRT and LCD to display information for the user, such as process results, progress of the process, setting change screen of the video encoding process executed by the CPU 301.

A removable media drive 307 is mainly used when writing a file to the hard disk drive 306 from removable media, or writing the file read from the hard disk drive 306 to the removable media. As the removable media, a floppy disk (FD), CD-ROM, CD-R, CD-R/W, DVD-ROM, DVD-R, DVD-R/W or MO, memory card, CF card, smart media, SD card, memory stick or the like may be used.

A network interface 308 is for connecting the video encoding device 1 that is a computer device to an external network. For example, the input image 9 is inputted to the video encoding device 1 through the network interface 308, and the stream 11 after the encoding process is outputted to an external device or the like from the video encoding device 1 through the network interface 308.

Further, the hardware configuration of the video encoding device in accordance with the present embodiment shown in FIG. 17 is merely an example, and it is needless to say that any other hardware configuration may be used.

SUMMARY

As described above, in accordance with the present embodiment, it is possible to reduce the processing amount of the encoding process while maintaining the encoding efficiency.

Further, the scope of the present invention is not limited to the exemplary embodiment that has been illustrated and described, and also includes all embodiments which provide effects equivalent to those of the present invention. Moreover, the scope of the present invention may be defined by a desired combination of specific features among all the disclosed features.

APPENDICES

As is apparent from what has been described in detail in the embodiments in accordance with the present invention, some or all of the above-described embodiments may be also described as the following appendices. However, the following appendices are merely simple examples, and the present invention is not limited thereto.

Appendix 1

A video encoding method, which is performed by a video encoding device having an AFF mode determining unit and a video encoding unit, the method including a first step of performing mode determination of adaptive field/frame coding by the AFF mode determining unit when an input image is an interlaced image, and a second step of encoding the input image by the video encoding unit in accordance with a determination result of the mode determination in the first step.

Appendix 2

A computer-readable storage medium storing a video encoding program for executing a first step of performing mode determination of adaptive field/frame coding when an input image is an interlaced image, and a second step of encoding the input image in accordance with a determination result of the mode determination in the first step.

In accordance with these configurations, it is possible to reduce the processing amount of the encoding process while maintaining the encoding efficiency.

INDUSTRIAL APPLICABILITY

The present invention may be used in an apparatus for compressing, transmitting, broadcasting and/or recoding digital video information, such as a digital video recorder, video conferencing system and television transmission system.

DESCRIPTION OF REFERENCE NUMERALS 1 video encoding device
9 input image 10 original image
11 stream
12, 12' reconstructed image
13 intra-frame prediction image
14 inter-frame prediction image
15 prediction image
16 difference image
17 restored difference image
110 video encoding unit
120 external memory
130 encoding controller
140 AFF mode determining unit
141 VPD determination unit
141a VPD buffer
142 MV determination unit
142a MV buffer
143 integration determination unit
144 changing unit
150 original image generating unit
151 original image converting unit
152 original image memory
160 reconstructed image converting unit
161 reconstructed image writing unit
162 reconstructed image reading unit
170 memory bus
210 intra-frame prediction unit
220 inter-frame prediction unit
230 mode selection unit
240 orthogonal transformation unit
250 quantization unit
260 inverse quantization unit
270 inverse orthogonal transformation unit
280 variable length encoding unit
302 keyboard
302a mouse
303 display interface
306 hard disk drive
307 removable media drive
308 network interface
D1 intra-frame prediction information
D2 intra-frame prediction error
D3 inter-frame prediction information
D4 inter-frame prediction error
D6 code amount information
D7 encoding mode selection information
D8 quantization coefficient
D9 frequency component
D10 quantization value
D11 restored frequency component
D21 mode determination information
D31 pixel information
D32 MV (motion vector) information
D33 MV (motion vector) critical value
D81 intra-frame prediction information
D82 intra-frame prediction error
D83 inter-frame prediction information
D84 inter-frame prediction error
D86 code amount information
D87 encoding mode selection information
D88 quantization coefficient
D89 frequency component
D90 quantization value
D91 restored frequency component
S1 encoding setting information
90 original image
91 stream
92 reconstructed image
93 intra-frame prediction image
94 inter-frame prediction image
95 prediction image
96 difference image
97 restored difference image
810 video encoding unit for performing frame coding
820 video encoding unit for performing field coding
830 AFF mode selection unit
860 video encoding unit for performing frame coding in PAFF
861 video encoding unit for performing frame coding in MBAFF
862 video encoding unit for performing field coding in MBAFF
863 MBAFF mode selection unit
870 video encoding unit for performing field coding in PAFF
880 PAFF mode selection unit
910 intra-frame prediction image
910 intra-frame prediction unit
920 inter-frame prediction unit
930 mode selection unit
940 orthogonal transformation unit
950 quantization unit
960 inverse quantization unit
970 inverse orthogonal transformation unit
980 variable length encoding unit
990 encoding controller

What is claimed is:

1. A video encoding device, comprising:
an AFF mode determining unit configured to perform a mode integration determination of adaptive field/frame coding when an input image is an interlaced image; and
a video encoding unit configured to encode the input image according to a determination result of the mode determination by the AFF mode determining unit,
wherein the AFF mode determining unit includes:
a vertical pixel difference (VPD) determination unit configured to perform a mode determination of the adaptive field/frame coding by estimating a texture value in the field coding of the input image based on an absolute difference of pixel values between a top field and a bottom field constituting a pair, estimating a texture value in the frame coding based on an absolute difference of pixel values between adjacent lines in the top field or the bottom field, and selecting the coding that gives a smaller texture value;
a motion vector (MV) determination unit configured to perform a mode determination of the adaptive field/frame coding by receiving motion vector information that is a result of inter-frame prediction of a picture that has been subjected to an encoding process in the video encoding unit, estimating a motion vector cost by assigning different weights to x and y components of the vector information, and calculating the number of times at which the estimated cost exceeds a critical value; and
an integration determination unit configured to perform the mode integration determination based on a mode determination result in the VPD determination unit and a mode determination result in the MV determination unit.

2. The video encoding device of claim 1, wherein the integration determination unit performs the mode integration determination by assigning weights to the mode determination result in the VPD determination unit and the mode determination result in the MV determination unit.

3. The video encoding device of claim 1, wherein the AFF mode determining unit further includes a changing unit configured to change a setting for the mode integration determination in the integration determination unit.

4. A video encoding method, comprising:
performing mode integration determination of adaptive field/frame coding when an input image is an interlaced image; and
encoding the input image according to a determination result of the mode determination,
wherein said performing mode integration determination includes:
performing a first mode determination of the adaptive field/frame coding by estimating a texture value in the field coding of the input image based on an absolute difference of pixel values between a top field and a bottom field constituting a pair, estimating a texture value in the frame coding based on an absolute difference of pixel values between adjacent lines in the top field or the bottom field, and selecting the coding that gives a smaller texture value;
performing a second mode determination of the adaptive field/frame coding by receiving motion vector information that is a result of inter-frame prediction of a picture that has been subjected to an encoding process, estimating a motion vector cost by assigning different weights to x and y components of the vector information, and calculating the number of times at which the estimated cost exceeds a critical value; and
performing the mode integration determination based on results of the first and the second mode determination.

5. The video encoding method of claim 4, wherein the mode integration determination is performed by assigning weights to the results of the first and the second mode determination.

6. A storage medium that stores a video encoding program for executing the video encoding method described in claim 4.

* * * * *